United States Patent [19]
Lieurance

[11] Patent Number: 5,488,877
[45] Date of Patent: Feb. 6, 1996

[54] CENTRIFUGAL INERTIA DRIVE

[76] Inventor: Richard L. Lieurance, 5141 Hwy. 78, No. 47A, Stone Mountain, Ga. 30087-3432

[21] Appl. No.: 138,036

[22] Filed: Oct. 15, 1993

[51] Int. Cl.⁶ .................................................. F16H 33/20
[52] U.S. Cl. ............................................. 74/84 R; 74/61
[58] Field of Search ........................... 74/61, 84 R, 84 S, 74/87, DIG. 9; 180/7.1

[56] References Cited

U.S. PATENT DOCUMENTS

| | | | |
|---|---|---|---|
| 3,530,617 | 9/1970 | Halvorson et al. | 74/84 S X |
| 3,968,700 | 7/1976 | Cuff | 74/84 S |
| 4,242,918 | 1/1981 | Srogi | 74/84 S |
| 5,167,163 | 12/1992 | McMahon | 74/84 S |

FOREIGN PATENT DOCUMENTS

| | | | |
|---|---|---|---|
| 933483 | 4/1948 | France | 74/84 S |
| 2288882 | 5/1976 | France | 74/84 S |
| 573912 | 3/1958 | Italy | 74/84 S |
| 52-4952 | 1/1977 | Japan | 74/DIG. 9 |
| 57-157075 | 9/1982 | Japan | 74/84 S |
| 1362509 | 12/1987 | U.S.S.R. | 74/61 |

OTHER PUBLICATIONS

Science and Invention Encyclopedia vol. 14, Propulsion Inertial, pp. 1874 thru 1877 Published by H. S. Stuttman Co., Inc. New York, N.Y. 10016 Copy Write: Marshall Cavendish Limited 1977 5P(0007)25/170.

*Primary Examiner*—Allan D. Herrmann
*Attorney, Agent, or Firm*—Kevin P. Crosby

[57] ABSTRACT

Two phases of weight or mass of equal value are interconnected at a fixed distance which rotate and interact with a force retainer having a circular path. Both phases move equally but in opposite direction from the center of rotation on a guide. The guide is connected at its linear mid point to a shaft that is supported in rotation by sleeves or bearings that are firmly attached to a frame. The force retainer is also attached to the frame. The combination allows the shaft to be rotated at a frequency that causes a centrifugal force to act upon the phases. The phases interact with the circular path through rollers forcing the phase radius to change from a normal orbit of equal radius. This causes an imbalance of centrifugal forces acting on the phases. The difference between the two centrifugal forces is transmitted to the frame through the phase rollers interacting with the circular path of the force retainer. The magnitude of centrifugal force of the phases are dependent upon frequency. The force applied to the frame is a vector equal to the greater of two centrifugal forces. Multiple guides with interconnected phase pairs can be used on a single shaft to produce more uniform resultant force vectors. Multiple shafts with one or more guides and phase pairs can be used on a single frame to increase the magnitude of the resultant force.

21 Claims, 5 Drawing Sheets

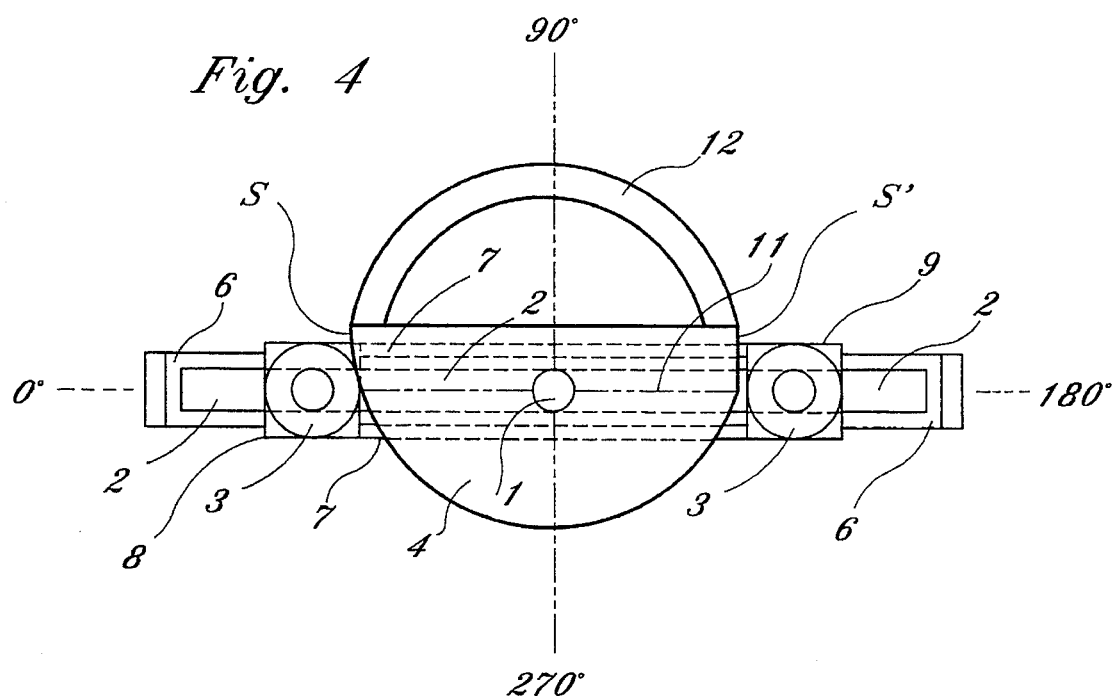
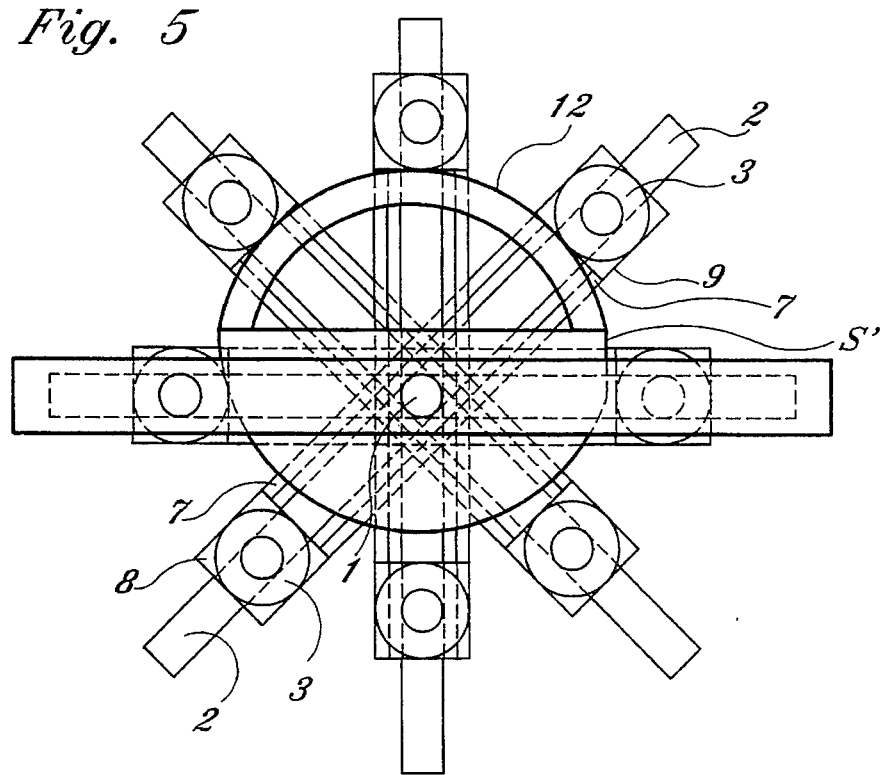

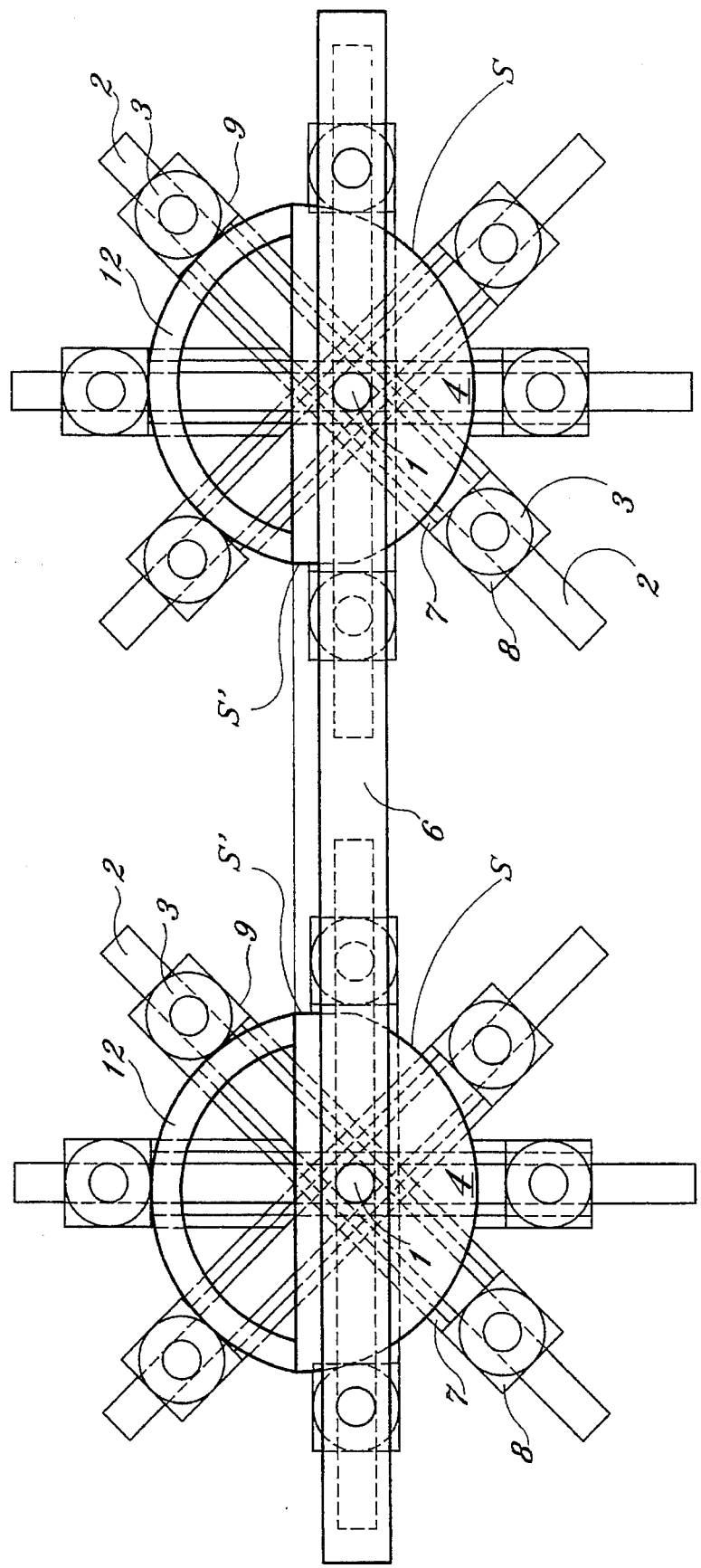

CENTRIFUGAL INERTIA DRIVE

BACKGROUND OF THE INVENTION

1. Field of the Invention

This invention converts centrifugal forces into a usable unified directional force vector, with magnitude and direction.

2. Description of the Prior Art

An inertial propulsion system which generated a vectored force was described in Science and Invention Encyclopedia, Volume 14, 1977; Propulsion, Inertial, page 1875. To develop the force vector, this system utilized one end of a gyro's spin axis interacting in a circular path. The gyro was attached to a shaft that rotated the gyro and its spin axis in a horizontal circular motion. The circular path of the gyro was positioned on a 45 degree angle to the center of the shaft's rotation. The gyro's rotation was started at the highest point of the circular path. The gyro was then rotated through the 45 degree inclined circular path, being forced downward for the first 180 degree movement of the shaft. Forcing the gyro downward produced an upward force that equaled the gyro mass weight. The gyro was then allowed to precess upward through the second 180 degree movement positioning itself at the highest point of the circular path, in position to be forced down in a repeat of its first half cycle.

The described prior art system shares some of the same characteristics of the Centrifugal Inertia Drive systems of the present invention:

1. Both systems will produce a vectored force that will not require an external surface, liquid, atmosphere, or gravitational field in which it must operate from or within;

2. Both systems produce a vectored force by using rotational energy;

3. Both systems use independent forces that interact with circular paths to produce a vectored force; and 4. Both systems are reusable and can be self contained.

While there are similarities, the Centrifugal Inertia Drive, which is the subject of the present invention, provides many advantages over the prior art. Some of the advantages of this invention over prior art, and, accordingly, some of the objects of this invention include:

1. The vectored force produced is variable;

2. The vectored force can be greater than the system combined mass weight;

3. Independent centrifugal forces are used in this invention to create a vectored force instead of gyro and gyroscopic characteristics used in the prior art;

4. The prior art system's circular path is horizontal with respect to its resultant force vector while in the present invention the circular path is vertical with respect to its resultant force vector.

Further advantages and objects of this invention will become apparent from a consideration of the drawings and ensuing description.

SUMMARY OF THE INVENTION

Centrifugal Inertia Drive produces a force vector with magnitude and direction. This force is produced by two interconnected masses in rotation where the radius of each mass, from the center of rotation, varies equally but in opposite directions. This action produces two independent centrifugal forces that pull both masses outward from the center of rotation at different force magnitudes. This imbalance in centrifugal force between the two masses as they rotate through the centrifugal inertia drive cycle creates a force vector. The resultant force vector obeys the laws of physics and is mathematically predictable. The two mass system can be combined in multiples to create larger and more unified vectored forces.

In accordance with these and other objects which will become apparent hereinafter, the present invention will now be described with particular reference to the accompanying drawings.

BRIEF DESCRIPTION OF THE DRAWINGS AND TABLES

1. Reference Tables:

Table 1 Phase radius in feet from 0 to 90 degrees and 180 to 270 degrees.

Table 2 Phase 8 minus phase 9 centrifugal force in pounds.

Table 3 Resultant force and vector summary from 0 to 45 degrees.

Table 4 Force and vector summary from 0 to 2 degrees.

2. Drawing Figures.:

FIG. 1 Front elevational view of single cell.

FIG. 2 Front elevational view of force retainer.

FIG. 3 Top view of a single cell single stage system.

FIG. 4 Cross-sectional view of a single cell single stage system.

FIG. 5 Front elevational view of a four cell one stage system.

FIGS. 6A–6D End elevational view of various phase configurations.

FIG. 7 Front elevational view of a four cell two stage system.

FIG. 8 Graph of force output for four cell single stage system operating at 100 to 600 revolutions per minute.

FIG. 9. Perspective view of a single cell single stage system.

DESCRIPTION OF THE PREFERRED EMBODIMENTS

Overview of the Invention

The Centrifugal Inertia Drive, as shown in FIG. 9, includes a rotational shaft 1 with at least one guide 2 that establishes guideways perpendicularly attached to shaft 1. At least two phases, constituting mass values, 8 and 9 are movably attached to guide 2 and are interconnected by interconnection 7 at a fixed separation distance D, forming a phase pair. At least one roller 3 is attached to an end of each phase. The roller contacts at least one semi-circular disk-shaped force retainer 4 which has an aperture to receive shaft 1 and an arcuate circumferential outer surface S. The position of the aperture on force retainer 4 is such that when rollers 3 are in contact with surface S the radius of each phase of a phase pair varies in relation to its center of rotation about shaft 1. Force retainer 4 is attached to a frame 6 which has a corresponding aperture to receive shaft 1. Frame 6 permits rotation of the shaft, movement of the phases along the guideways, and provides a suitable surface for attachment of other objects to the device.

In this embodiment, a pair of interconnected phases, with phase rollers, movably mounted on a guide is referred to as a cell, FIG. 1. The device can be configured with multiple cells, FIG. 5. Each device with one or more cells is referred to as a stage. A multistage device refers to a device configured with more than one stage, FIG. 7.

Figure 1:
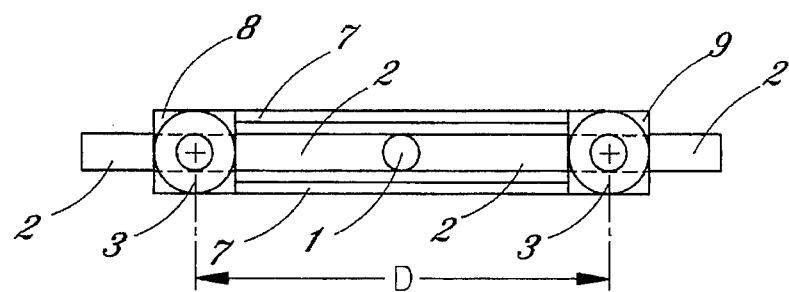
FIG. 1 shows a front elevational view of a single cell. Phase guide 2 and shaft 1 are connected together and both will rotate clockwise when the system is in operation. Phase 8 slides or moves on the guideways formed by guide 2. Phase 8 is rotatably connected to a roller 3 that tracks and interacts with force retainer 4 (not shown in FIG. 1) along arcuate circumferential surface S. Phase 9 is a duplication of phase 8. Phases 8 and 9 are connected to each other by interconnection 7 a fixed distance D apart. Phases 8 and 9 move equally but in opposite directions in relation to the rotational central axis of shaft 1 and guide 2. Phases 8 and 9, rollers 3, interconnection 7, and guide 2 form a single cell that rotates with shaft 1.

Minimum lower vertical radius equals 0.375 times D;

Horizontal radius equals 0.5 times D;

Maximum upper vertical radius equals 0.625 times D.

To achieve these phase radii, the radius of surface S is 0.52083333 times D minus roller 3 radius and is centered at pivot point 10. The center of aperture A is positioned 0.14583333 times D from pivot point 10 along vertical center line Y. The center of aperture A is shown by the intersection of vertical center line Y and horizontal center line X in FIG. 2. As shown on the right side of force retainer 4 in FIG. 2, one end of arcuate circumferential surface S ends where it intersects horizontal center line X. Horizontal center line X defines a horizontal reference line 11 as shown on force retainer 4 in FIG. 2. At this intersection of surface S and horizontal reference line 11, surface S ceases to be an arcuate circumferential surface and becomes a liner surface S' which is parallel to vertical center line Y.

Figure 3:
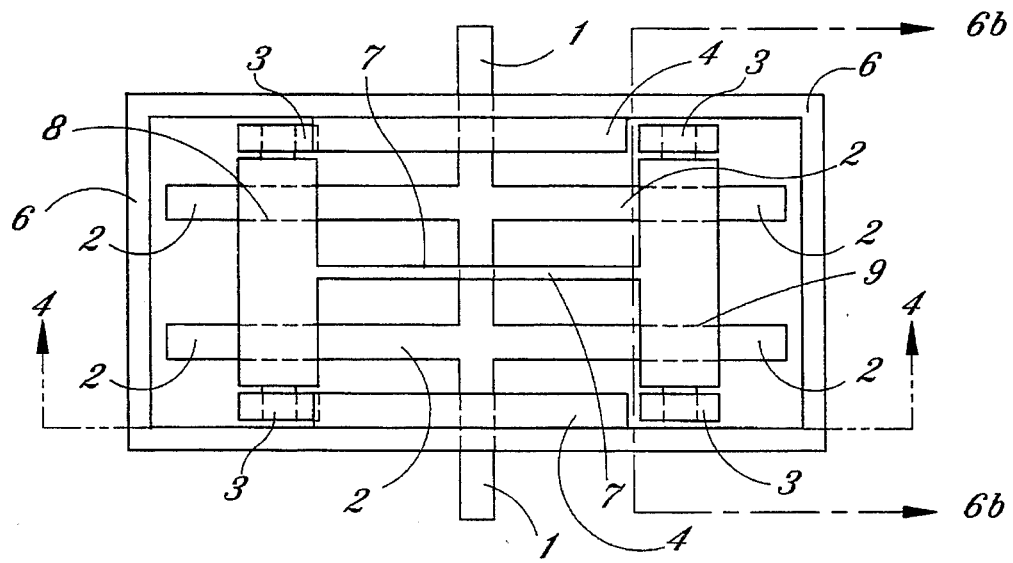

FIG. 3 shows a top view of a single cell single stage system. Force retainer 4 is secured to frame 6 and houses a sleeve or bearing (not shown) that maintains alignment of shaft 1 to frame 6. Phases 8 and 9 are shown on horizontal line 11 of retainer 4. In this position, roller 3 of phase 8 is in contact with arcuate surface S of force retainer 4. Roller 3 of phase 9 slightly clears surface S'.

FIG. 4 shows a cross-sectional view of a single cell single stage system with roller guard 12 which prevents phase roller 3 from being inhibited by the upper edge of force retainer 4 during starting and ending of a phase rotational cycle. Roller guard 12 is shaped as an ellipsoid instead of a circle so that when rollers 3 are in the upper portion of rotation they do not contact roller guard 12. Roller guard 12 provides a surface for rollers 3 to contact when the device is at rest. When the device begins rotation, roller guard 12 prevents rollers 3 from contacting the horizontal top surface S" of force retainer 4. The portion of frame 6 not shown in the cross-section would maintain force retainer 4 position as shown. Frame 6 would be attached to an object (not shown) in a manner that would provide clearance for guide 2 rotation.

FIG. 5 shows a four cell single stage system. Frame 6 would be attached to an object (not shown) to be pushed or pulled with regard to the resultant force vector in the linear direction. The method of attachment to the object must provide clearance for guide 2 rotation. FIG. 5 also shows the position of rollers 3 on guide 12 when the device is at rest.

FIGS. 6A through 6D illustrate an end elevational view of various phase configurations. In all these FIGS., the rollers 3 are attached to shafts 5 which protrude outward from both sides of the phase body. In the preferred embodiment, these shafts 5 are machined portions of the phase body, but they could be separate shafts attached to the phases. The configuration of rollers 3 rotating on shafts 5 form a conventional type wheel and axle arrangement. Applications with high durability requirements will use rotational type sleeves or bearings that support rollers 3 on the phase shafts 5 and will provide reduced roller 3 friction losses.

Figure 6A:
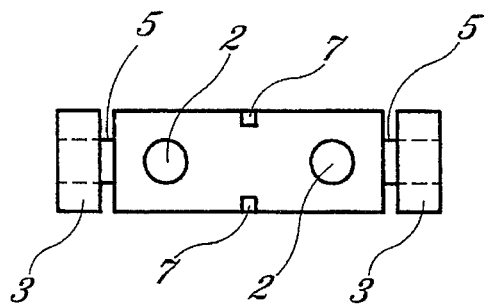
Figure 6B:
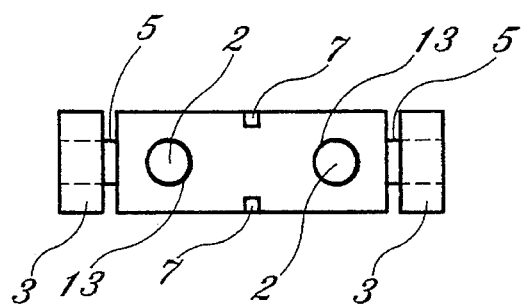
Figure 6C:
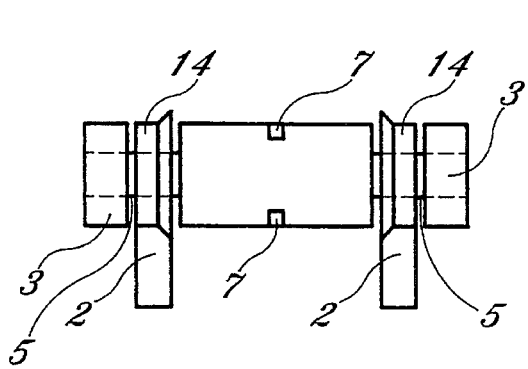
Figure 6D:
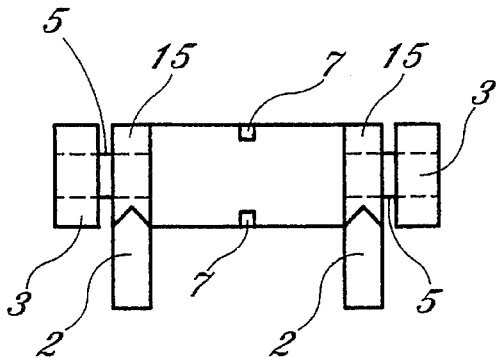

Phase movement on guide 2 entails four basic methods and are shown in FIGS. 6A through 6D. In FIG. 6A, the space provided for guide 2 penetration through the phase body has adequate clearance so phases slide on guide 2 without binding. In FIG. 6B, linear type sleeves or bearings are used at location FIG. 6C shows guide 2 reconfigured as a track or rail where item 14 rotates with or without sleeves or bearings on the phase's protruding shaft 5. FIG. 6D shows item 15 configured as a friction reducing substance such as Teflon or brass to slide on rails or tracks. All four basic methods shown in FIGS. 6A through 6D perform the same function of allowing the phases to move or slide on guide 2.

FIG. 7 shows a two stage system with four cells in each stage. Frame 6 would be attached to an object (not shown) to be pushed or pulled with regard to the resultant force vector in the linear direction. Attachment means (not shown) must provide clearance for guide 2 rotation.

Figure 8:
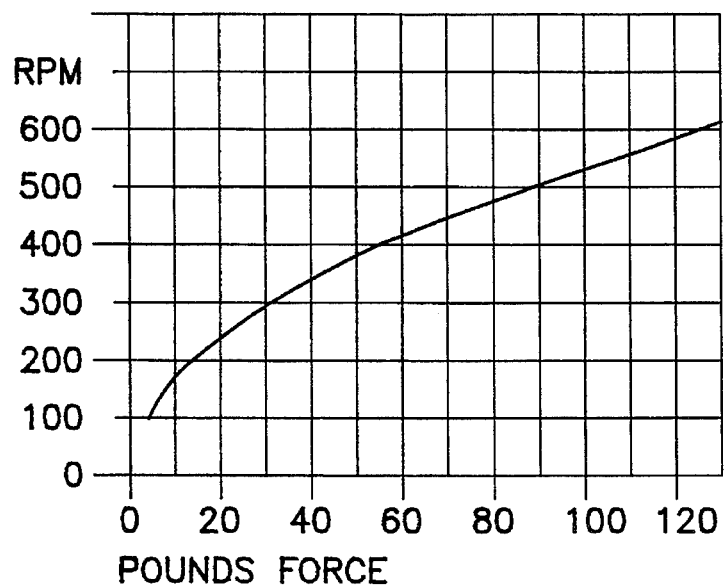

FIG. 8 illustrates variable force output of a four cell single stage system, operating within 100 to 600 revolutions per minute.

Figure 9:
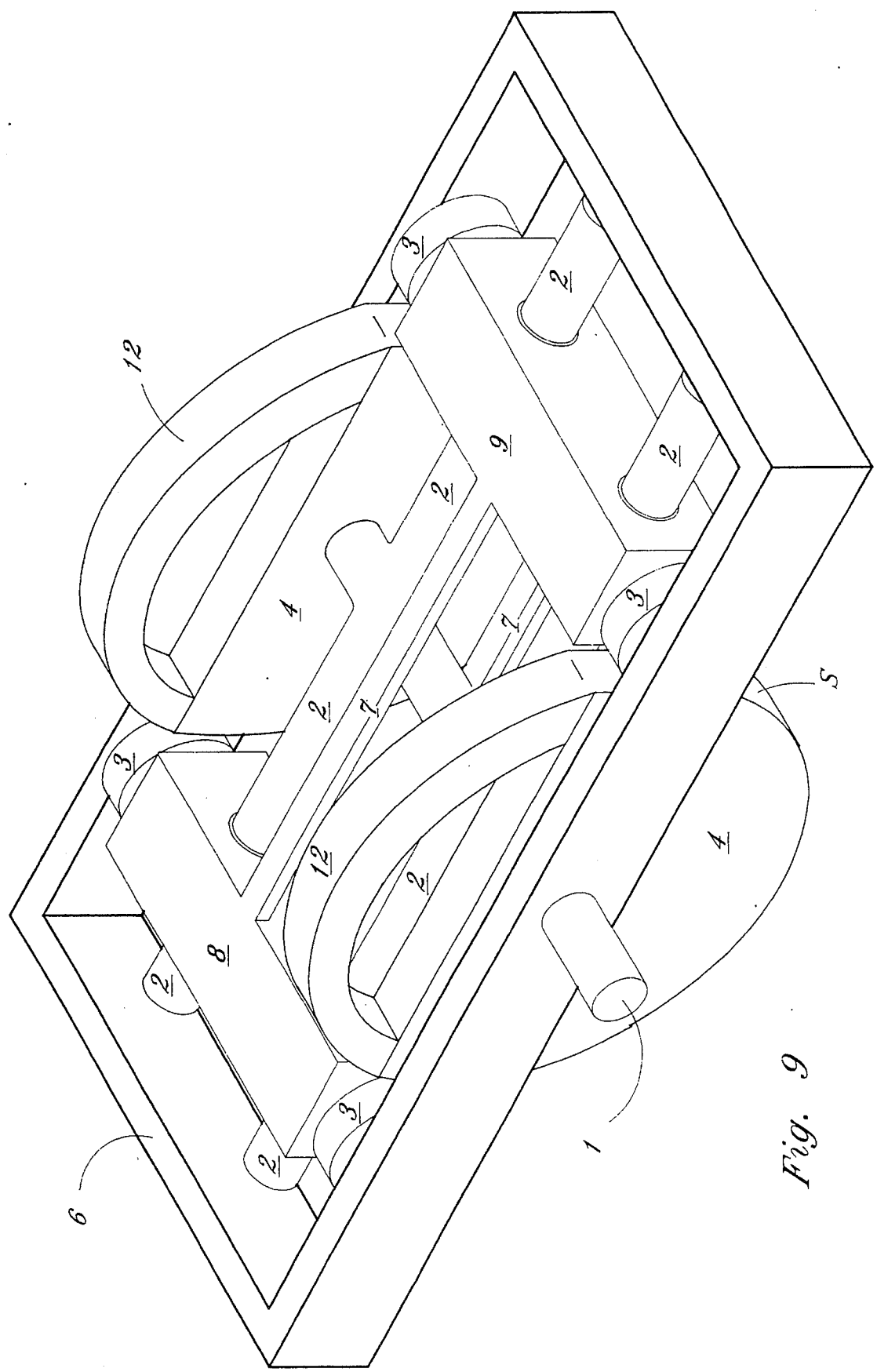

FIG. 9 shows a perspective view of a single-cell configuration.

Operation of the Invention

The operation of an embodiment will be described referring to FIG. 4 with phase weight of 2 pounds, dimension D between phase centers of twelve inches, and with the system operating at 300 revolutions per minute.

Initially, phase 8 is at 0 degrees, with phase 9 at 180 degrees along horizontal reference line 11 of force retainer 4. Phase 8 and 9's radius, velocity and centrifugal force are equal at this point in the cycle. As phase 8 starts to move in a clockwise direction above horizontal reference line 11 its distance from the center of rotation about shaft 1 is slightly increased due to roller 3 contact on arcuate surface S. Due to interconnection 7, the distance of phase 9 to the center of rotation about shaft 1 is simultaneously decreased by a corresponding amount. The difference between phase 8 and phase 9 radius from the center of rotation about shaft 1 causes a slight imbalance in centrifugal forces acting on the phases. As phase 8 continues on its clockwise path, its velocity, radius, and centrifugal force increase, while the velocity, radius and centrifugal force of phase 9 decreases.

The action of the phases is caused by the contact of the rollers 3 on the arcuate surface S of force retainer 4 and rotation of guide 2 which allows the phases to move while interconnection 7 maintains a fixed 12 inch distance between phase 8 and 9. When roller 3 of phase 8 contacts with arcuate surface S above reference line 11 the distance between phase 8 and its center of rotation about shaft 1 increases. The increased distance between phase 8 and its center of rotation in comparison to phase 9 causes an increase in the centrifugal force acting on phase 8 in relation to the centrifugal force acting on phase 9. The increased centrifugal force acting on phase 8 overcomes the centrifugal force of phase 9 and pulls roller 3 of phase 9 into arcuate surface S because of interconnection 7.

As rotation continues, roller 3 of phase 9 will contact arcuate surface S at or slightly below the horizontal reference line 11. Roller 3 does not contact surface S'. The force of roller 3 of phase 9 against arcuate surface S of force retainer 4 continues to increase during rotation, applying a force that equals phase 8 minus phase 9 centrifugal force. This force has a vector that points toward phase 8 in the upper cycle. When phase 8 achieves 90 degrees above horizontal line 11, its velocity, radius, and centrifugal force will be at its maximum with phase 9 velocity, radius, and centrifugal force at its minimum. As phase 8 continues its clockwise path, its velocity, radius, and centrifugal force decrease while phase 9 velocity, radius, and centrifugal force increase. When phase 8 completes one-half cycle and is positioned at 180 degrees on horizontal reference line 11 of force retainer 4, its velocity, radius, and centrifugal force will match phase 9 velocity, radius, and centrifugal force at 0 degrees. As phase 8 starts its downward path from its 180 degree position, it repeats phase 9 lower half cycle and phase 9 repeats phase 8 upper half cycle, thereby repeating the operation discussed above with phases 8 and 9 interchanged.

Phase radius and velocity increases and decreases with rotation of guide 2 and a maximum and minimum occurs one time per cycle for each phase. The shortest radius that the phases will experience during their orbit occurs at 270 degrees. Starting from 270 degrees and rotating clockwise, velocity continues to increase and maximizes at 90 degrees. Passing 90 degrees, velocity starts to decrease and continues to decrease until 270 degrees is reached. The radius and velocity change is due to the orbital path of the phases being offset by roller 3 contact with arcuate surface S on force retainer 4 and the greater centrifugal force of the phase opposite the phase with its roller in contact with surface S. When phase radius is equal on both phases, centrifugal force of each phase cancel out, and therefore, no force gain occurs at 0 and 180 degree positions. In this example, the cycle frequency remains constant at 300 revolutions per minute or one cycle every 0.2 seconds.

Imbalance in centrifugal forces relates to Newton's first and second laws of motion. A derivative of force equals mass times acceleration, and can be used for centripetal or centrifugal force with variables of weight, frequency, and radius.

Stated mathematically:

$$Fc = M\,Ac \quad \begin{array}{l} Fc = \text{force centripetal} \\ M = \text{mass} \\ Ac = \text{acceleration centripetal} \end{array}$$

Centripetal acceleration equals velocity squared divided by radius.

$$Ac = V^2/r \quad \begin{array}{l} Ac = \text{accerleration centripetal} \\ V^2 = \text{velocity squared} \\ r = \text{radius} \end{array}$$

Velocity equals circumference multiplied by frequency.

$$V = 2\pi r f \quad \begin{array}{l} V = \text{velocity} \\ r = \text{radius} \\ f = \text{frequency} \\ \pi = 3.1415927 \end{array}$$

Substituting for velocity squared.

$$Fc = M\,(2\pi r f)^2/r \quad \begin{array}{l} Fc = \text{force centripetal} \\ M = \text{mass} \\ (2\pi r f)^2/r = V^2 r = Ac \\ r = \text{radius} \\ \pi = 3.1415927 \end{array}$$

Brackets and square functions removed.

$$Fc = M 2 2 \pi \pi r r f f / r$$

Radius divided by radius cancel, 2 multiplied by 2.

$$Fc = M 4\pi^2 r f^2 \quad \begin{array}{l} fc = \text{force centripetal} \\ M = \text{mass} \\ \pi = 3.1414927 \\ r = \text{radius} \\ f = \text{frequency} \end{array}$$

Four multiplied by Pi squared.

$$C = 4\pi^2 \quad C = 39.478418 = \text{constant}$$
$$\pi^2 = 9.8696044$$

Outside gravitational fields.

$$Fc = MCrf^2 \quad \begin{array}{l} Fc = \text{force centripetal} \\ M = \text{mass} \\ C = 39.478418 \\ r = \text{radius} \\ f = \text{frequency} \end{array}$$

Earth gravitational field mass=weight/g.

$$M = W/g \quad \begin{array}{l} M = \text{mass} \\ W = \text{weight} \\ g = 32\ \text{Ft./Sec.}^2 \end{array}$$

Substituting weight for mass.

$$Fc = MCrf^2$$
$$Fc/Crf^2 = M = W/G$$
$$Fc/Crf^2 = W/g$$
$$(g/1)(Fc/Crf^2) = (W/g)(G/1)$$
$$gFc/Crf^2 = Wg/g$$
$$gFc/Crf^2 = W$$
$$gFc = WCrf^2$$
$$Fc = WCrf^2/g$$

$Fc = \text{force centripetal}$
$W = \text{weight}$
$C = 39.478418$
$r = \text{radius}$
$f = \text{frequency}$
$g = 32\ \text{Ft./Sec.}^2$ The equation for Fc states that the magnitude of centripetal or centrifugal force experienced by an object as it travels through a circular path is in proportion to its weight, frequency, and radius. The value of f in the above equation is in cycles per second when used with units of feet and pounds.

Table One shows phase 8 appropriate radius in feet from 0 to 90 degrees and 180 to 270 degrees.

Table Two is a plot of phase 8 upper half cycle from 0 to 180 degrees and shows phase 8 minus phase 9 centrifugal force. The degree indicated in Table Two is also a force vector on a single cell system causing this system to pulsate to upper left, upward and then to upper right two times each complete cycle. To increase this pulsation multiple cells are used.

Table Three is a resultant force and vector summary for movement of 0 to 45 degrees of a four cell single stage system, as shown in FIG. 5, with all eight phases operating in the cycle. The resultant force and vector of Table Three was obtained by using an x, y coordinate system with force components and vector addition of phases in the upper cycle. The resultant forces and vectors given in Table Three are instantaneous values that occur eight times in each cycle. The data in Table Three indicates 31.3 to 31.7 pounds of resultant force with vectors of 89.5 to 90.4 degrees. The force applied to interconnection 7 remains constant throughout the cycle at 61.7 pounds and is equal to phase 8 plus phase 9 centrifugal forces. As the number of cells increase per stage the resultant force and vector output become closer to a constant uniform numerical value.

Table Four gives the first three degree movement of phases at, and than above, horizontal reference line 11 of force retainer 4. The cosine and sine of phase angles are multiplied by the force to obtain $F_x$ and $F_y$ components and then added. The tangent of the vector is equal to $F_y/F_x$ and the resultant force equals the square root of $F_y^2$ plus $F_x^2$.

FIG. 8 illustrates resultant force output as revolutions per minute are increased or decreased on a four cell single stage system. The curve starts at 100 and increases to 600 revolutions per minute.

Summary and Scope

The physical body of the phases in the above examples have been presented as rectangular in form to maintain clarity. This should not be construed as limiting phase body physical characteristics to rectangular form, but merely to provide illustration.

The number of cells per stage and number of stages are not limited, but can be combined or configured to obtain multi-force vectors as in FIG. 7. Stages of larger sizes will require a rim to stabilize phase guides and cells during rotation. This rim will connect guide ends forming a type of conventional wheel with spokes when viewed from the center of shaft 1. The rim can be of light or heavyweight material to reduce or increase gyroscopic behavior during rotation. When rotated, the stages will exhibit gyroscopic behavior with or without a rim. Gimbaling or lateral circular movement of frame 6 will be required on some applications.

Force retainer 4 was shown as stationary in the above examples but may be realigned or movable to redirect the resultant force output vector within a 360 degree plane of shaft 1 rotation.

Counter torque caused by phase inertia during rotation can be offset by a second stage or stages, of equal value, that rotate in the opposite direction. This configuration is illustrated in FIG. 7. Ratios given in the specification are approximate values and can be varied to produce lesser or greater force output of systems.

The mathematical equations used in above specifications neglected friction losses and yield approximate values that are used herein to place numerical values on the system. This should not be construed as limiting the characteristics of this system but merely to provide illustration.

The reader will see that this invention converts centrifugal forces into a usable unified vectored force with magnitude. This invention can be used to push or pull objects. In addition, this invention will not co-depend on a surface, liquid, atmosphere, or gravitational field to operate from or within. This invention is reusable and powered by rotational energy. Resultant vectored force is an integral product of the invention.

Although the description above contains many specifics, these should not be construed as limiting the scope of this invention but as merely providing illustrations of some of the presently preferred embodiments. For example, this invention can be used in conjunction with past, present, or future technologies to aid and/or improve their means of movement.

Numerous other applications will be derived for the use of the resultant force produced by this invention. Thus, the scope of this invention should be determined by the appended claims and their legal equivalents, rather than by examples given.

I claim:

1. Centrifugal inertia drive comprising:

a guide establishing an even number of multiple guideways of predetermined linear length that extend outward from a central axis in a radial manner at equal angular intervals;

a shaft coinciding with the central axis of the radial configuration of said guideways;

a phase establishing a mass value supporting bidirectional linear movability in a matching manner to said guideways with a duplication of said phase mounted on each said guideway of said guide that forms multiple sets of two said phases with an angular displacement of 180 degrees;

a roller rotatably connected to each said phase;

a frame that rotatively aligns the central axis of said shaft in a manner that will not inhibit rotation of said guide;

a retainer means that continuously configures the net centrifugal force differences of said phases of said sets to an approximate constant linear vector establishing a resultant force equal to the vector addition of said centrifugal force differences physically transmitted to said frame and to any object attached thereto with centrifugal force braking effect of said phases of said sets reduced to that of said net centrifugal force differences of normal friction losses through direct interaction with an interconnection means;

said interconnection means having the same rotational frequency of said shaft or said guide that contains the centrifugal forces of said phases of said sets establishing bidirectional linear movement of the two said phases of said sets that occur in equal but opposite directions from the central axis of said shaft or said guide.

2. The centrifugal inertia drive of claim 1 wherein said retainer means through direct interaction with said interconnection means forms one of any number of operational cells where the algebraic sum of centrifugal forces of the two said phases of said sets will range from zero to a greater numerical value and back to zero two times per cycle.

3. The centrifugal inertia drive of claim 2 wherein force experienced by said cell equals a numerical addition of the centrifugal forces of the two said phases that will remain at a constant numerical value for a given frequency regardless of distance of said phases of said set from the central axis.

4. The centrifugal inertia drive of claim 2 wherein said retainer means aligns the centrifugal and centripetal components of said centrifugal force difference of the two said phases of said cell to the same rotating directional plane two times per cycle.

5. The centrifugal inertia drive of claim 1 further including a guard means for preventing said roller of said phases from being inhibited during starting and ending of rotational cycle of said guide.

6. The centrifugal inertia drive of claim 1 wherein said retainer means can be rotated through 360 degrees relative to the central axis of said guide or said shaft to redirect resultant force vector.

7. The centrifugal inertia drive of claim 1 wherein open ends of said guideways can be joined establishing a rim to stabilize and or to increase or decrease gyroscopic behavior of said guide.

8. The centrifugal inertia drive of claim 1 wherein said guideways of said guide can be configured as elongated circular members with said phases configured in a matching manner for bidirectional linear movability thereon.

9. The centrifugal inertia drive of claim 1 wherein said guideways of said guide can be configured as tracks or rails with said phases configured in a matching manner for bidirectional linear movability thereon.

10. The centrifugal inertia drive of claim 1 wherein originates an increase in the linear inertia value that is equal to the vector addition of said centrifugal force differences that is required to enter one of three transitional states where the increased linear inertia value must be transferred to another object or a linear velocity change must take place or a combination thereof.

11. The centrifugal inertial drive of claim 1 wherein establishes a single stage that can be applied in a singular or multiple forms.

12. Centrifugal inertia drive comprising:

a guide establishing an even number of multiple guideways of predetermined linear length that extend outward from a central axis in a radial manner at equal angular intervals;

a phase establishing a mass value supporting bidirectional linear movability in a matching manner to said guideways with a duplication of said phase mounted on each said guideway of said guide that forms multiple sets of two said phases with an angular displacement of 180 degrees;

a frame that rotatively aligns the central axis of said guide in a manner that will not inhibit rotation;

a retainer means that continuously configures the net centrifugal force differences of said phases of said sets to an approximate constant linear vector establishing a resultant force equal to the vector addition of said centrifugal force differences physically transmitted to said frame and to any object attached thereto with centrifugal force braking effect of said phases of said sets reduced to that of said net centrifugal force differences of normal friction losses through direct interaction with an interconnection means;

said interconnection means having the same rotational frequency of said guide that contains the centrifugal forces of said phases of said sets establishing bidirectional linear movement of the two said phases of said sets that occur in equal but opposite directions from the central axis of said guide.

13. The centrifugal inertia drive of claim 12 wherein said retainer means through the direct interaction with said interconnection means forms operational cells where the algebraic sum of centrifugal forces of the two said phases of said sets will range from zero to a greater numerical value and back to zero two times per cycle.

14. The centrifugal inertia drive of claim 13 wherein force experienced by said cell equals a numerical addition of the centrifugal forces of the two said phases that will remain at a constant numerical value for a given frequency regardless of distance of said phases of said set from the central axis.

15. The centrifugal inertia drive of claim 13 wherein said retainer means aligns the centrifugal and centripetal components of said centrifugal force difference of the two said phases of said cell to the same rotating directional plane two times per cycle.

16. The centrifugal inertia drive of claim 12 wherein the retainer means can be rotated through 360 degrees relative to the central axis of said guide to redirect resultant force vector.

17. The centrifugal inertia drive of claim 12 wherein the open ends of said guideways can be joined establishing a rim to stabilize and or to increase or decrease gyroscopic behavior of said guide.

18. The centrifugal inertia drive of claim 12 wherein said guideways of said guide can be configured as elongated circular members with said phases configured in a matching manner for bidirectional linear movability thereon.

19. The centrifugal inertia drive of claim 12 wherein said guideways of said guide can be configured as tracks or rails with said phases configured in a matching manner for bidirectional linear movability thereon.

20. The centrifugal inertia drive of claim 12 wherein originates an increase in the linear inertia value that is equal to the vector addition of said centrifugal force differences that is required to enter one of three transitional states where the increased linear inertial value must be transferred to another object or a linear velocity change must take place or a combination thereof.

21. The centrifugal inertia drive of claim 12 wherein establishes a single stage that can be applied in singular or multiple forms.

* * * * *

UNITED STATES PATENT AND TRADEMARK OFFICE
CERTIFICATE OF CORRECTION

PATENT NO.   : 5488877
DATED        : February 6, 1996
INVENTOR(S)  : Lieurance

It is certified that error appears in the above-identified patent and that said Letters Patent is hereby corrected as shown below:

Columns 1 through 10, should be deleted and replace with the attached pages.

Signed and Sealed this

Fifth Day of November, 1996

Attest:

BRUCE LEHMAN

Attesting Officer

Commissioner of Patents and Trademarks

CENTRIFUGAL INERTIA DRIVE

BACKGROUND OF THE INVENTION

Field of the Invention

This invention converts centrifugal forces into a usable unified directional force vector, with magnitude and direction.

Description of the Prior Art

An inertial propulsion system which generated a vectored force was described in Science and Invention Encyclopedia, Volume 14, 1977; Propulsion, Inertial, page 1875. To develop the force vector, this system utilized one end of a gyro's spin axis interacting in a circular path. The gyro was attached to a shaft that rotated the gyro and its spin axis in a horizontal circular motion. The circular path of the gyro was positioned on a 45 degree angle to the center of the shaft's rotation. The gyro's rotation was started at the highest point of the circular path. The gyro was then rotated through the 45 degree inclined circular path, being forced downward for the first 180 degree movement of the shaft. Forcing the gyro downward produced an upward force that equalled the gyro mass weight. The gyro was then allowed to precess upward through the second 180 degree movement positioning itself at the highest point of the circular path, in position to be forced down in a repeat of its first half cycle.

The described prior art system shares some of the same characteristics of the Centrifugal Inertia Drive systems of the present invention:

1. Both systems will produce a vectored force;
2. Both systems produce a vectored force by using rotational energy;
3. Both systems use independent forces that interact with circular paths to produce a vectored force; and
4. Both systems are reusable and can be self contained.

While there are similarities, the Centrifugal Inertia Drive, which is the subject of the present invention, provides many advantages over the prior art. Some of the advantages of this invention over prior art, and, accordingly, some of the objects of this invention include:

1. The vectored force produced is variable;
2. The vectored force can be greater than the system combined mass weight;
3. Independent centrifugal forces are used in this invention to create a vectored force instead of gyro and gyroscopic characteristics used in the prior art;
4. The prior art system's circular path is horizontal with respect to its resultant force vector while in the present invention the circular path is vertical with respect to its resultant force vector.

Further advantages and objects of this invention will become apparent from a consideration of the drawings and ensuing description.

BRIEF SUMMARY OF THE INVENTION

Centrifugal Inertia Drive produces a force vector with magnitude and direction. This force is produced by two interconnected masses in rotation where the radius of each mass, from the center of rotation, varies equally but in opposite directions. This action produces two independent centrifugal forces that pull both masses outward from the center of rotation at different force magnitudes. This imbalance in centrifugal force between the two masses as they rotate through the centrifugal inertia drive cycle creates a force vector. The resultant force vector obeys the laws of physics and is mathematically predictable. The two mass system can be combined in multiples to create larger and more unified vectored force.

In accordance with these and other objects which will become apparent hereinafter, the present invention will now be described with particular reference to the accompanying tables and drawings.

REFERENCE TABLES

Table 1 Phase radius in feet from 0 to 90 degrees and 180 to 270 degrees.

Table 2 Phase 8 minus phase 9 centrifugal force in pounds.

Table 3 Resultant force and vector summary from 0 to 45 degrees.

Table 4 Force and vector summary from 0 to 2 degrees.

DRAWING FIGURES

FIG. 1 front elevational view of single cell.

Figure 2:
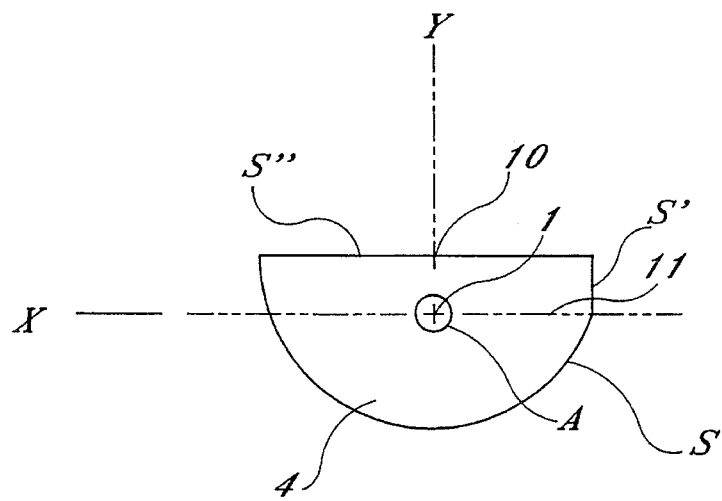
FIG. 2 shows a semi-circular disk force retainer 4 having an aperture A to receive shaft 1 and an arcuate circumferential outer surface S such that when phases rollers 3 are in contact with surface S the radius of the phase centers relative to the central axis of shaft 1 or guide 2 are as follows.

FIG. 2 front elevational view of force retainer.

FIG. 3 top view of a single cell single stage system.

FIG. 4 cross-sectional view of a single cell single stage system.

FIG. 5 front elevational view of a four cell one stage system.

FIG. 6a–6d end elevational view of various phase configurations.

FIG. 7 front elevational view of a four cell two stage system.

FIG. 8 graph of force output for four cell single stage system operating at 100 to 600 revolutions per minute.

FIG. 9 perspective view of a single cell single stage system.

OVERVIEW OF THE INVENTION

The Centrifugal Inertia Drive, as shown in FIG. 9, includes a rotational shaft 1 with at least one guide 2 that establishes guideways perpendicularly attached to shaft 1. At least two phases, constituting mass values, 8 and 9 are movably attached to guide 2 and are interconnected by interconnection 7 at a fixed separation distance D, forming a phase pair. At least one roller 3 is attached to an end of each phase. The roller contacts at least one semi-circular disk-shaped force retainer 4 which has an aperture to receive shaft 1 and arcuate circumferential outer surface S. The position of the aperture on force retainer 4 is such that when rollers 3 are in contact with surface S the radius of each phase of a phase pair varies in relation to its center of rotation about shaft 1. Force retainer 4 is attached to a frame 6 which has a corresponding aperture to receive shaft 1. Frame 6 permits rotation of the shaft, movement of the phases along the guideways, and provides a suitable surface for attachment of other objects to the device.

In this embodiment, a pair of interconnected phases, with phase rollers, movably mounted on a guide is referred to as a cell, FIG. 1. The device can be configured with multiple cells, FIG. 5. Each device with one or more cells is referred to as a stage. A multistage device refers to a device configured with more than one stage, FIG. 7.

DESCRIPTION OF THE DRAWINGS

FIG. 1 shows a front elevational view of a single cell. Phase guide 2 and shaft 1 are connected together and both will rotate clockwise when the system is in operation. Phase 8 slides or moves on the guideways formed by guide 2. Phase 8 is rotatably connected to a roller 3 that tracks and interacts with force retainer 4 (not shown in FIG. 1) along arcuate circumferential surface S. Phase 9 is a duplication of phase 8. Phases 8 and 9 are connected to each other by interconnection 7 a fixed distance D apart. Phases 8 and 9 move equally but in opposite directions in relation to the rotational central axis of shaft 1 and guide 2. Phases 8 and 9, rollers 3, interconnection 7, and guide 2 form a single cell that rotates with shaft 1.

FIG. 2 shows a semi-circular disk force retainer 4 having an aperture A to receive shaft 1 and arcuate circumferential outer surface S such that when phases rollers 3 are in contact with surface S the radius of the phase centers relative to the central axis of shaft 1 or guide 2 are as follows:

Minimum lower vertical radius equals 0.375 times D;
Horizontal radius equals 0.5 times D;
Maximum upper vertical radius equals 0.625 times D;

To achieve these phase radii, the radius of surface S is 0.52083333 times D minus roller 3 radius and is centered at pivot point 10. The center of aperture A is positioned 0.14583333 times D from pivot point 10 along vertical center line Y. The center of aperture A is shown by the intersection of vertical center line Y and horizontal center line X in FIG. 2. As shown on the right side of force retainer 4 in FIG. 2, one end of arcuate circumferential surface S ends where it intersects horizontal center line X. Horizontal center line X defines a horizontal reference line 11 as shown on force retainer 4 in FIG. 2. At this intersection of surface S and horizontal reference line 11, surface S ceases to be an arcuate circumferential surface and becomes a liner surface S' which is parallel to vertical center line Y.

FIG. 3 shows a top view of a single cell single stage system. Force retainer 4 is secured to frame 6 and houses a sleeve or bearing (not shown) that maintains alignment of shaft 1 to frame 6. Phases 8 and 9 are shown on horizontal line 11 of retainer 4. In this position, roller 3 of phase 8 is in contact with arcuate surface S of force retainer 4. Roller 3 of phase 9 slightly clears surface S'.

FIG. 4 shows a cross-sectional view of a single cell single stage system with roller guard 12 which prevents phase roller 3 from being inhibited by the upper edge of force retainer 4 during starting and ending of a phase rotational cycle. Roller guard 12 is shaped as an ellipsoid instead of a circle so that when rollers 3 are in the upper portion of rotation they do not contact roller guard 12. Roller guard 12 provides a surface for rollers 3 to contact when guide 2 is at rest. When guide 2 begins rotation, roller guard 12 prevents rollers 3 from contacting the horizontal top surface S" of force retainer 4. The portion of frame 6 not shown in the cross-section would maintain force retainer 4 position as shown. Frame 6 would be attached to an object (not shown) in a manner that would provide clearance for guide 2 rotation.

FIG. 5 shows a four cell single stage system. Frame 6 would be attached to an object (not shown) to be pushed or pulled with regard to resultant force vector in the linear direction. The method of attachment to the object must provide clearance for guide 2 rotation. FIG. 5 also shows the position of rollers 3 on guard 12 when guide 2 is at rest.

FIGS. 6a through 6d illustrate an end elevational view of various phase configurations. In all these Figs., the rollers 3 are attached to shafts 5 which protrude outward from both sides of the phase body. In the preferred embodiment, these shafts 5 are machined portions of the phase body, but they could be separate shafts attached to the phases. The configuration of rollers 3 rotating on shafts 5 form a conventional type wheel and axle arrangement. Applications with high durability requirements will use rotational type sleeves or bearings that support rollers 3 on the phase shafts 5 and will provide reduced roller 3 friction losses.

Phase movement on guide 2 entails four basic methods and are shown in FIGS. 6a through 6d. In FIG. 6a, the space provided for guide 2 penetration through the phase body has adequate clearance so phases slide on guide 2 without binding. In FIG. 6b, linear type sleeves or bearings are used at location 13. FIG. 6c shows guide 2 reconfigured as a track or rail where item 14 rotates with or without sleeves or bearings on the phase's protruding shaft 5. FIG. 6d shows item 15 configured as a friction reducing substance such as Teflon or brass to slide on rails or tracks. All four basic methods shown in FIGS. 6a through 6d perform the same function of allowing the phases to move or slide on guide 2.

FIG. 7 shows a two stage system with four cells in each stage. Frame 6 would be attached to an object (not shown) to be pushed or pulled with regard to the resultant force vector in the linear direction. Attachment means (not shown) must provide clearance for guide 2 rotation.

FIG. 8 illustrates variable force output of a four cell single stage system, operating within 100 to 600 revolutions per minute.

FIG. 9 shows a perspective view of a single-cell configuration.

OPERATION OF THE INVENTION

The operation of this embodiment will be described referring to FIG. 4 with phase weight of 2 pounds, dimension D between phase centers of twelve inches, and with the system operating at 300 revolutions per minute.

Initially, phase 8 is at 0 degrees, with phase 9 at 180 degrees along horizontal reference line 11 of force retainer 4. Phase 8 and 9's radius, velocity and centrifugal force are equal at this point in the cycle. As phase 8 starts to move in a clockwise direction above horizontal reference line 11 its distance from the center of rotation about shaft 1 is slightly increased due to roller 3 contact on arcuate surface S. Due to interconnection 7, the distance of phase 9 to the center of rotation about shaft 1 is simultaneously decreased by a corresponding amount. The difference between phase 8 and phase 9 radius from the center of rotation about shaft 1 causes a slight imbalance in centrifugal forces acting on the phases. As phase 8 continues on its clockwise path, its velocity, radius, and centrifugal force increase, while the velocity, radius and centrifugal force of phase 9 decreases.

The action of the phases is caused by the contact of the rollers 3 on the arcuate surface S of force retainer 4 and rotation of guide 2 which allows the phases to move while interconnection 7 maintains a fixed 12 inch distance between phase 8 and 9. When roller 3 of phase 8 contacts with arcuate surface S above reference line 11 the distance between phase 8 and its center of rotation about shaft 1 increases. The increased distance between phase 8 and its center of rotation in comparison to phase 9 causes an increase in the centrifugal force acting on phase 8 in relation to the centrifugal force acting on phase 9. The increased centrifugal force acting on phase 8 overcomes the centrifugal force of phase 9 and pulls roller 3 of phase 9 into arcuate surface S because of interconnection 7.

As rotation continues, roller 3 of phase 9 will contact arcuate surface S at or slightly below the horizontal reference line 11. Roller 3 does not contact surface S'. The force of roller 3 of phase 9 against arcuate surface S of force retainer 4 continues to increase during rotation, applying a force that equals phase 8 minus phase 9 centrifugal force. This force has a vector that points toward phase 8 in the upper cycle. When phase 8 achieves 90 degrees above horizontal line 11, its velocity, radius, and centrifugal force will be at its maximum with phase 9 velocity, radius, and centrifugal force at its minimum. As phase 8 continues its clockwise path, its velocity, radius, and centrifugal force decrease while phase 9 velocity, radius, and centrifugal force increase. When phase 8 completes one-half cycle and is positioned at 180 degrees on horizontal reference line 11 of force retainer 4, its velocity, radius, and centrifugal force will match phase 9 velocity, radius, and centrifugal force at 0 degrees. As phase 8 starts its downward path from its 180 degree position, it repeats phase 9 lower half cycle and phase 9 repeats phase 8 upper half cycle, thereby repeating the operation discussed above with phases 8 and 9 interchanged.

Phase radius and velocity increases and decreases with rotation of guide 2 and a maximum and minimum occurs one time per cycle for each phase. The shortest radius that the phases will experience during their orbit occurs at 270 degrees. Starting from 270 degrees and rotating clockwise, velocity continues to increase and maximizes at 90 degrees. Passing 90 degrees, velocity starts to decrease and continues to decrease until 270 degrees is reached. The radius and velocity change is due to the orbital path of the phases being offset by roller 3 contact with arcuate surface S on force retainer 4 and the greater centrifugal force of the phase opposite the phase with its roller in contact with surface S. When phase radius is equal on both phases, centrifugal force of each phase cancel out, and therefore, no force gain occurs at 0 and 180 degree positions. In this example, the cycle frequency remains constant at 300 revolutions per minute or one cycle every 0.2 seconds.

Imbalance in centrifugal forces relates to Newton's first and second laws of motion. A derivative of force equals mass times acceleration, and can be used for centripetal or centrifugal force with variables of weight, frequency, and radius.

Stated mathematically:

$$Fc = M Ac \quad \begin{array}{l} Fc = \text{force centripetal} \\ M = \text{mass} \\ Ac = \text{acceleration centripetal} \end{array}$$

Centripetal acceleration equals velocity squared divided by radius.

$$Ac = V^2/r \quad \begin{array}{l} Ac = \text{accerleration centripetal} \\ V^2 = \text{velocity squared} \\ r = \text{radius} \end{array}$$

Velocity equals circumference multiplied by frequency.

$$V = 2\pi rf \quad \begin{array}{l} V = \text{velocity} \\ r = \text{radius} \\ f = \text{frequency} \\ \pi = 3.1415927 \end{array}$$

Substituting for velocity squared.

$$Fc = M(2\pi rf)^2/r \quad \begin{array}{l} Fc = \text{force centripetal} \\ M = \text{mass} \\ (2\pi rf)^2/r = V^2r = Ac \\ r = \text{radius} \\ \pi = 3.1415927 \end{array}$$

Brackets and square functions removed.

$$Fc = M22\pi\pi rrff/r$$

Radius divided by radius cancel, 2 multiplied by 2.

$$Fc = M4\pi^2 rf^2 \quad \begin{array}{l} fc = \text{force centripetal} \\ M = \text{mass} \\ \pi = 3.1414927 \\ r = \text{radius} \\ f = \text{frequency} \end{array}$$

Four multiplied by Pi squared.

$$C = 4\pi^2 \quad \begin{array}{l} C = 39.478418 = \text{constant} \\ \pi^2 = 9.8696044 \end{array}$$

Outside gravitational fields.

$$Fc = MCrf^2 \quad \begin{array}{l} Fc = \text{force centripetal} \\ M = \text{mass} \\ C = 39.478418 \\ r = \text{radius} \\ f = \text{frequency} \end{array}$$

Earth gravitational field mass=weight/g.

$$M = W/g \quad \begin{array}{l} M = \text{mass} \\ W = \text{weight} \\ g = 32 \text{ Ft./Sec.}^2 \end{array}$$

Substituting weight for mass.

$Fc = MCrf^2$         $Fc$ = force centripetal
$Fc/Crf^2 = M = W/G$    $W$ = weight
$Fc/Crf^2 = W/g$       $C = 39.478418$
$(g/1)(Fc/Crf^2) = (W/g)(g/1)$   $r$ = radius
$gFc/Crf^2 = Wg/g$     $f$ = frequency
$gFc/Crf^2 = W$        $g = 32$ Ft./Sec.$^2$
$gFc = WCrf^2$
$Fc = WCrf^2/g$ The equation for Fc states that the magnitude of centripetal or centrifugal force experienced by an object as it travels through a circular path is in proportion to its weight, frequency, and radius. The value of f in the above equation is in cycles per second when used with units of feet and pounds.

Table One shows phase 8 approximate radius in feet from 0 to 90 degrees and 180 to 270 degrees.

Table Two is a plot of phase 8 upper half cycle from 0 to 180 degrees and shows phase 8 minus phase 9 centrifugal force. The degree indicated in Table Two is also a force vector on a single cell system causing this system to pulsate to upper left, upward and then to upper right two times each complete cycle. To increase this pulsation multiple cells are used.

Table Three is a resultant force and vector summary for movement of 0 to 45 degrees of a four cell single stage system, as shown in FIG. 5, with all eight phases operating in the cycle. The resultant force and vector of Table Three was obtained by using an x, y coordinate system with force components and vector addition of phases in the upper cycle. The resultant forces and vectors given in Table Three are instantaneous values that occur eight times in each cycle. The data in Table Three indicates 31.3 to 31.7 pounds of resultant force with vectors of 89.5 to 90.4 degrees. The force applied to interconnection 7 remains constant throughout the cycle at 61.7 pounds and is equal to phase 8 plus phase 9 centrifugal forces. As the number of cells increase per stage the resultant force and vector output become closer to a constant uniform numerical value.

Table Four gives the first three degree movement of phases at, and than above, horizontal reference line 11 of force retainer 4. The cosine and sine of phase angles are multiplied by the force to obtain Fx and Fy components and then added. The tangent of the vector is equal to Fy/Fx and the resultant force equals the square root of Fy$^2$ plus Fx$^2$.

FIG. 8 illustrates resultant force output as revolutions per minute are increased or decreased on a four cell single stage system. The curve starts at 100 and increases to 600 revolutions per minute.

SUMMARY AND SCOPE

The physical body of the phases in the above examples have been presented as rectangular in form to maintain clarity. This should not be construed as limiting phase body physical characteristics to rectangular form, but merely to provide illustration.

The number of cells per stage and number of stages are not limited, but can be combined or configured to obtain multi-force vectors as in FIG. 7. Stages of larger sizes will require a rim to stabilize phase guides and cells during rotation. This rim will connect guide ends forming a type of conventional wheel with spokes when viewed from the center of shaft 1. The rim can be of light or heavyweight material to reduce or increase gyroscopic behavior during rotation. When rotated, the stages will exhibit gyroscopic behavior with or without a rim. Gimbaling or lateral circular movement of frame 6 will be required on some applications.

Force retainer 4 was shown as stationary in the above examples but may be realigned or movable to redirect the resultant force output vector within a 360 degree plane of shaft 1 rotation.

Counter torque caused by phase inertia during rotation can be offset by a second stage or stages, of equal value, that rotate in the opposite direction. This configuration is illustrated in FIG. 7. Ratios given in the specification are approximate values and can be varied to produce lesser or greater force output of systems.

The mathematical equations used in above specifications neglected friction losses and yield approximate values that are used herein to place numerical values on the system. This should not be construed as limiting the characteristics of this system but merely to provide illustration.

The reader will see that this invention converts centrifugal forces into a usable unified vectored force with magnitude. This invention can be used to push or pull objects. In addition, this invention is reusable and powered by rotational energy. Resultant vectored force is an integral product of the invention.

Although the description above contains many specifics, these should not be construed as limiting the scope of this invention but as merely providing illustrations of some of the presently preferred embodiments. For example, this invention can be used in conjunction with past, present, or future technologies to aid and/or improve their means of movement.

Numerous other applications will be derived for the use of the resultant force produced by this invention. Thus, the scope of this invention should be determined by the appended claims and their legal equivalents, rather than by examples given.

I claim:
1. Centrifugal inertia drive comprising:
   a guide establishing an even number of multiple guideways of predetermined length extending outward from a central axis in a radial manner at equal angular intervals;
   a shaft coinciding with the central axis of the radial configuration of said guideways;
   a phase establishing a mass value supporting bidirectional linear movability in a matching manner to said guideways with a duplication of said phase mounted on each said guideway of said guide configuring multiple sets of two said phases with an angular displacement of 180 degrees;
   a roller rotatably connected to each said phase;
   a frame rotatively aligning the central axis of said shaft in a manner not inhibiting rotation of said guide;
   a retainer means focussing the net centrifugal force differences of said phases of said sets to an approximate constant vector establishing a resultant force equal to the vector addition of said centrifugal force differences physically transmitted to said frame and to any object attached thereto with centrifugal force braking effect of said phases of said sets reduced to said net centrifugal force differences of normal friction losses through association with an interconnection means;

said interconnection means having the same rotational frequency of said shaft and said guide in relationship of containing the centrifugal forces of said phases of each said set establishing bidirectional linear movement of the two said phases occurring in equal but opposite directions from the central rotational axis line of said shaft and said guide.

2. The centrifugal inertia drive of claim 1 wherein said retainer means through association with said interconnection means forms operational cells with each operational cell containing a minimum of two said phases having an angular displacement of 180 degrees establishing the algebraic sum of the centrifugal forces to range from zero to a greater numerical value and back to zero two times per cycle.

3. The centrifugal inertia drive of claim 2 wherein force contained within said operational cell equals a numerical addition of the centrifugal forces establishing a constant numerical value for a given frequency.

4. The centrifugal inertia drive of claim 2 wherein the centrifugal and centripetal components of said centrifugal force difference of said operational cell are aligned to the same rotating directional plane two times per cycle.

5. The centrifugal inertia drive of claim 1 further including a guard means for preventing said roller of said phases from being inhibited during starting and ending of rotational cycle of said guide.

6. The centrifugal inertia drive of claim 1 wherein said retainer means can be rotated through 360 degrees relative to said central rotational axis line of said guide or said shaft to redirect resultant force vector.

7. The centrifugal inertia drive of claim 1 wherein open ends of said guideways can be joined establishing a rim to stabilize and or to increase or decrease gyroscopic behavior of said guide.

8. The centrifugal inertia drive of claim 1 wherein said guideways of said guide can be configured as elongated circular members with said phases configured in a matching manner for bidirectional linear movability thereon.

9. The centrifugal inertia drive of claim 1 wherein said guideways of said guide can be configured as tracks or rails with said phases configured in a matching manner for bidirectional linear movability thereon.

10. The centrifugal inertia drive of claim 1 wherein originates an increase in the inertia value that is equal to the vector addition of said centrifugal force differences that is required to enter one of three transitional states where the increased inertia value must be transferred to another object or a velocity change must take place or a combination thereof.

11. The centrifugal inertia drive of claim 1 wherein establishes a single stage that can be applied in singular or multiple forms.

12. Centrifugal inertia drive comprising:
a guide establishing an even number of multiple guideways of predetermined linear length that extend outward from a central axis in a radial manner at equal angular intervals;
a phase establishing a mass value supporting bidirectional linear movability in a matching manner to said guideways with a duplication of said phase mounted on each said guideway of said guide configuring multiple sets of two said phases with an angular displacement of 180 degrees;
a frame rotatively aligning the central axis of said guide in a manner not inhibiting rotation;
a retainer means focussing the net centrifugal force differences of said phases of said sets to an approximate constant vector establishing a resultant force equal to the vector addition of said centrifugal force differences physically transmitted to said frame and to any object attached thereto with centrifugal force braking effect of said phases of said sets reduced to said net centrifugal force differences of normal friction losses through association with an interconnection means;
said interconnection means having the same rotational frequency of said guide in relationship of containing the centrifugal forces of said phases of each said set establishing bidirectional linear movement of the two said phases occurring in equal but opposite directions from the central rotational axis line of said guide.

13. The centrifugal inertia drive of claim 12 wherein said retainer means through association with said interconnection means forms operational cells with each operational cell containing a minimum of two said phases having an angular displacement of 180 degrees establishing the algebraic sum of centrifugal forces to range from zero to a greater numerical value and back to zero two times per cycle.

14. The centrifugal inertia drive of claim 13 wherein force contained within said operational cell equals a numerical addition of the centrifugal forces establishing a constant numerical value for a given frequency.

15. The centrifugal inertia drive of claim 12 wherein said retainer means can be rotated through 360 degrees relative to said central rotational axis line of said guide to redirect resultant force vector.

16. The centrifugal inertia drive of claim 12 wherein open ends of said guideways can be joined establishing a rim to stabilize and or to increase or decrease gyroscopic behavior of said guide.

17. The centrifugal inertia drive of claim 12 wherein said guideways of said guide can be configured as elongated circular members with said phases configured in a matching manner for bidirectional linear movability thereon.

18. The centrifugal inertia drive of claim 12 wherein said guideways of said guide can be configured as tracks or rails with said phases configured in a matching manner for bidirectional linear movability thereon.

19. The centrifugal inertia drive of claim 12 wherein originates an increase in the inertia value that is equal to the vector addition of said centrifugal force differences that is required to enter one of three transitional states where the increased inertia value must be transferred to another object or a velocity change must take place or a combination thereof.

20. The centrifugal inertia drive of claim 12 wherein establishes a single stage that can be applied in singular or multiple forms.

* * * * *

UNITED STATES PATENT AND TRADEMARK OFFICE
CERTIFICATE OF CORRECTION

PATENT NO. : 5,488,877
DATED : February 6, 1996
INVENTOR(S) : Lieurance

It is certified that error appears in the above-identified patent and that said Letters Patent is hereby corrected as shown below:

The title page should be deleted and substitute therefor the attached title page.

Columns 1 through 10, should be deleted and replace with the attached pages.

Column 8, line 40, insert Tables 1-4, as per attached pages.

Signed and Sealed this

Eighth Day of April, 1997

*Attest:*

BRUCE LEHMAN

*Attesting Officer*    *Commissioner of Patents and Trademarks*

United States Patent [19]

Lieurance

[11] Patent Number: 5,488,877
[45] Date of Patent: Feb. 6, 1996

[54] CENTRIFUGAL INERTIA DRIVE

[76] Inventor: Richard L. Lieurance, 5141 Hwy. 78, No. 47A, Stone Mountain, Ga. 30087-3432

[21] Appl. No.: 138,036

[22] Filed: Oct. 15, 1993

[51] Int. Cl.$^6$ .................................................. F16H 33/20
[52] U.S. Cl. ................................................ 74/84 R; 74/61
[58] Field of Search ............................... 74/61, 84 R, 84 S, 74/87, DIG. 9; 180/7.1

[56] References Cited

U.S. PATENT DOCUMENTS

| | | | |
|---|---|---|---|
| 3,530,617 | 9/1970 | Halvorson et al. | 74/84 S X |
| 3,968,700 | 7/1976 | Cuff | 74/84 S |
| 4,242,918 | 1/1981 | Srogi | 74/84 S |
| 5,167,163 | 12/1992 | McMahon | 74/84 S |

FOREIGN PATENT DOCUMENTS

| | | | |
|---|---|---|---|
| 933483 | 4/1948 | France | 74/84 S |
| 2288882 | 5/1976 | France | 74/84 S |
| 573912 | 3/1958 | Italy | 74/84 S |
| 52-4952 | 1/1977 | Japan | 74/DIG. 9 |
| 57-157075 | 9/1982 | Japan | 74/84 S |
| 1362509 | 12/1987 | U.S.S.R. | 74/61 |

OTHER PUBLICATIONS

Science and Invention Encyclopedia vol. 14, Propulsion Inertial, pp. 1874 thru 1877 Published by H. S. Stuttman Co., Inc. New York, N.Y. 10016 Copy Write: Marshall Cavendish Limited 1977 SP(0007)25/170.

*Primary Examiner*—Allan D. Herrmann
*Attorney, Agent, or Firm*—Kevin P. Crosby

[57] ABSTRACT

Two phases of weight or mass of equal value are interconnected at a fixed distance which rotate and interact with a force retainer having a circular path. Both phases move equally but in opposite direction from the center of rotation on a guide. The guide is connected at its linear mid point to a shaft that is supported in rotation by sleeves or bearings that are firmly attached to a frame. The force retainer is also attached to the frame. The combination allows the shaft to be rotated at a frequency that causes a centrifugal force to act upon the phases. The phases interact with the circular path through rollers forcing the phase radius to change from a normal orbit of equal radius. This causes an imbalance of centrifugal forces acting on the phases. The difference between the two centrifugal forces is transmitted to the frame through the phase rollers interacting with the circular path of the force retainer. The magnitude of centrifugal force of the phases are dependent upon frequency. The force applied to the frame is a vector equal to the greater of two centrifugal forces. Multiple guides with interconnected phase pairs can be used on a single shaft to produce more uniform resultant force vectors. Multiple shafts with one or more guides and phase pairs can be used on a single frame to increase the magnitude of the resultant force.

20 Claims, 5 Drawing Sheets

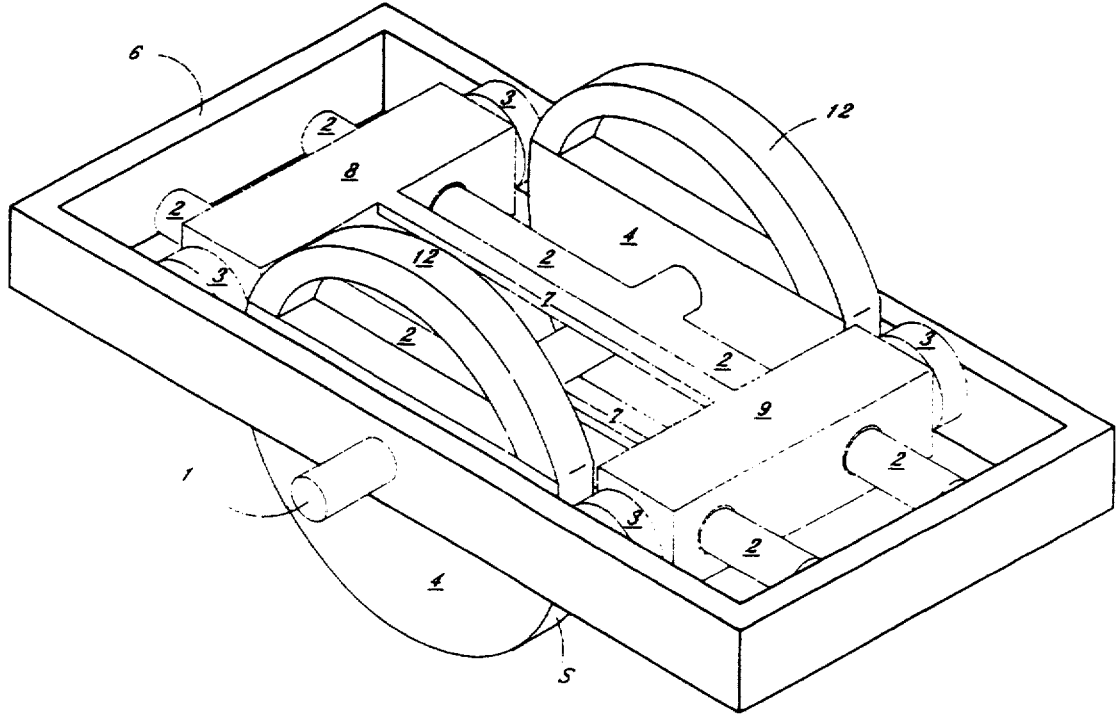

CENTRIFUGAL INERTIA DRIVE

BACKGROUND OF THE INVENTION

Field of the Invention

This invention converts centrifugal forces into a usable unified directional force vector, with magnitude and direction.

Description of the Prior Art

An inertial propulsion system which generated a vectored force was described in Science and Invention Encyclopedia, Volume 14, 1977; Propulsion, Inertial, page 1875. To develop the force vector, this system utilized one end of a gyro's spin axis interacting in a circular path. The gyro was attached to a shaft that rotated the gyro and its spin axis in a horizontal circular motion. The circular path of the gyro was positioned on a 45 degree angle to the center of the shaft's rotation. The gyro's rotation was started at the highest point of the circular path. The gyro was then rotated through the 45 degree inclined circular path, being forced downward for the first 180 degree movement of the shaft. Forcing the gyro downward produced an upward force that equalled the gyro mass weight. The gyro was then allowed to precess upward through the second 180 degree movement positioning itself at the highest point of the circular path, in position to be forced down in a repeat of its first half cycle.

The described prior art system shares some of the same characteristics of the Centrifugal Inertia Drive systems of the present invention:

1. Both systems will produce a vectored force;
2. Both systems produce a vectored force by using rotational energy;
3. Both systems use independent forces that interact with circular paths to produce a vectored force; and
4. Both systems are reusable and can be self contained.

While there are similarities, the Centrifugal Inertia Drive, which is the subject of the present invention, provides many advantages over the prior art. Some of the advantages of this invention over prior art, and, accordingly, some of the objects of this invention include:

1. The vectored force produced is variable;
2. The vectored force can be greater than the system combined mass weight;
3. Independent centrifugal forces are used in this invention to create a vectored force instead of gyro and gyroscopic characteristics used in the prior art;
4. The prior art system's circular path is horizontal with respect to its resultant force vector while in the present invention the circular path is vertical with respect to its resultant force vector.

Further advantages and objects of this invention will become apparent from a consideration of the drawings and ensuing description.

BRIEF SUMMARY OF THE INVENTION

Centrifugal Inertia Drive produces a force vector with magnitude and direction. This force is produced by two interconnected masses in rotation where the radius of each mass, from the center of rotation, varies equally but in opposite directions. This action produces two independent centrifugal forces that pull both masses outward from the center of rotation at different force magnitudes. This imbalance in centrifugal force between the two masses as they rotate through the centrifugal inertia drive cycle creates a force vector. The resultant force vector obeys the laws of physics and is mathematically predictable. The two mass system can be combined in multiples to create larger and more unified vectored force.

In accordance with these and other objects which will become apparent hereinafter, the present invention will now be described with particular reference to the accompanying tables and drawings.

REFERENCE TABLES

Table 1 Phase radius in feet from 0 to 90 degrees and 180 to 270 degrees.

Table 2 Phase 8 minus phase 9 centrifugal force in pounds.

Table 3 Resultant force and vector summary from 0 to 45 degrees.

Table 4 Force and vector summary from 0 to 2 degrees.

DRAWING FIGURES

FIG. 1 front elevational view of single cell.

FIG. 2 front elevational view of force retainer.

FIG. 3 top view of a single cell single stage system.

FIG. 4 cross-sectional view of a single cell single stage system.

FIG. 5 front elevational view of a four cell one stage system.

FIG. 6a–6d end elevational view of various phase configurations.

FIG. 7 front elevational view of a four cell two stage system.

FIG. 8 graph of force output for four cell single stage system operating at 100 to 600 revolutions per minute.

FIG. 9 perspective view of a single cell single stage system.

OVERVIEW OF THE INVENTION

The Centrifugal Inertia Drive, as shown in FIG. 9, includes a rotational shaft 1 with at least one guide 2 that establishes guideways perpendicularly attached to shaft 1. At least two phases, constituting mass values, 8 and 9 are movably attached to guide 2 and are interconnected by interconnection 7 at a fixed separation distance D, forming a phase pair. At least one roller 3 is attached to an end of each phase. The roller contacts at least one semi-circular disk-shaped force retainer 4 which has an aperture to receive shaft 1 and arcuate circumferential outer surface S. The position of the aperture on force retainer 4 is such that when rollers 3 are in contact with surface S the radius of each phase of a phase pair varies in relation to its center of rotation about shaft 1. Force retainer 4 is attached to a frame 6 which has a corresponding aperture to receive shaft 1. Frame 6 permits rotation of the shaft, movement of the phases along the guideways, and provides a suitable surface for attachment of other objects to the device.

In this embodiment, a pair of interconnected phases, with phase rollers, movably mounted on a guide is referred to as a cell, FIG. 1. The device can be configured with multiple cells, FIG. 5. Each device with one or more cells is referred to as a stage. A multistage device refers to a device configured with more than one stage, FIG. 7.

DESCRIPTION OF THE DRAWINGS

FIG. 1 shows a front elevational view of a single cell. Phase guide 2 and shaft 1 are connected together and both will rotate clockwise when the system is in operation. Phase 8 slides or moves on the guideways formed by guide 2. Phase 8 is rotatably connected to a roller 3 that tracks and interacts with force retainer 4 (not shown in FIG. 1) along arcuate circumferential surface S. Phase 9 is a duplication of phase 8. Phases 8 and 9 are connected to each other by interconnection 7 a fixed distance D apart. Phases 8 and 9 move equally but in opposite directions in relation to the rotational central axis of shaft 1 and guide 2. Phases 8 and 9, rollers 3, interconnection 7, and guide 2 form a single cell that rotates with shaft 1.

FIG. 2 shows a semi-circular disk force retainer 4 having an aperture A to receive shaft 1 and arcuate circumferential outer surface S such that when phases rollers 3 are in contact with surface S the radius of the phase centers relative to the central axis of shaft 1 or guide 2 are as follows:

Minimum lower vertical radius equals 0.375 times D;
Horizontal radius equals 0.5 times D;
Maximum upper vertical radius equals 0.625 times D;

To achieve these phase radii, the radius of surface S is 0.52083333 times D minus roller 3 radius and is centered at pivot point 10. The center of aperture A is positioned 0.14583333 times D from pivot point 10 along vertical center line Y. The center of aperture A is shown by the intersection of vertical center line Y and horizontal center line X in FIG. 2. As shown on the right side of force retainer 4 in FIG. 2, one end of arcuate circumferential surface S ends where it intersects horizontal center line X. Horizontal center line X defines a horizontal reference line 11 as shown on force retainer 4 in FIG. 2. At this intersection of surface S and horizontal reference line 11, surface S ceases to be an arcuate circumferential surface and becomes a liner surface S' which is parallel to vertical center line Y.

FIG. 3 shows a top view of a single cell single stage system. Force retainer 4 is secured to frame 6 and houses a sleeve or bearing (not shown) that maintains alignment of shaft 1 to frame 6. Phases 8 and 9 are shown on horizontal line 11 of retainer 4. In this position, roller 3 of phase 8 is in contact with arcuate surface S of force retainer 4. Roller 3 of phase 9 slightly clears surface S'.

FIG. 4 shows a cross-sectional view of a single cell single stage system with roller guard 12 which prevents phase roller 3 from being inhibited by the upper edge of force retainer 4 during starting and ending of a phase rotational cycle. Roller guard 12 is shaped as an ellipsoid instead of a circle so that when rollers 3 are in the upper portion of rotation they do not contact roller guard 12. Roller guard 12 provides a surface for rollers 3 to contact when guide 2 is at rest. When guide 2 begins rotation, roller guard 12 prevents rollers 3 from contacting the horizontal top surface S" of force retainer 4. The portion of frame 6 not shown in the cross-section would maintain force retainer 4 position as shown. Frame 6 would be attached to an object (not shown) in a manner that would provide clearance for guide 2 rotation.

FIG. 5 shows a four cell single stage system. Frame 6 would be attached to an object (not shown) to be pushed or pulled with regard to resultant force vector in the linear direction. The method of attachment to the object must provide clearance for guide 2 rotation. FIG. 5 also shows the position of rollers 3 on guard 12 when guide 2 is at rest.

FIGS. 6a through 6d illustrate an end elevational view of various phase configurations. In all these Figs., the rollers 3 are attached to shafts 5 which protrude outward from both sides of the phase body. In the preferred embodiment, these shafts 5 are machined portions of the phase body, but they could be separate shafts attached to the phases. The configuration of rollers 3 rotating on shafts 5 form a conventional type wheel and axle arrangement. Applications with high durability requirements will use rotational type sleeves or bearings that support rollers 3 on the phase shafts 5 and will provide reduced roller 3 friction losses.

Phase movement on guide 2 entails four basic methods and are shown in FIGS. 6a through 6d. In FIG. 6a, the space provided for guide 2 penetration through the phase body has adequate clearance so phases slide on guide 2 without binding. In FIG. 6b, linear type sleeves or bearings are used at location 13. FIG. 6c shows guide 2 reconfigured as a track or rail where item 14 rotates with or without sleeves or bearings on the phase's protruding shaft 5. FIG. 6d shows item 15 configured as a friction reducing substance such as Teflon or brass to slide on rails or tracks. All four basic methods shown in FIGS. 6a through 6d perform the same function of allowing the phases to move or slide on guide 2.

FIG. 7 shows a two stage system with four cells in each stage. Frame 6 would be attached to an object (not shown) to be pushed or pulled with regard to the resultant force vector in the linear direction. Attachment means (not shown) must provide clearance for guide 2 rotation.

FIG. 8 illustrates variable force output of a four cell single stage system, operating within 100 to 600 revolutions per minute.

FIG. 9 shows a perspective view of a single-cell configuration.

OPERATION OF THE INVENTION

The operation of this embodiment will be described referring to FIG. 4 with phase weight of 2 pounds, dimension D between phase centers of twelve inches, and with the system operating at 300 revolutions per minute.

Initially, phase 8 is at 0 degrees, with phase 9 at 180 degrees along horizontal reference line 11 of force retainer 4. Phase 8 and 9's radius, velocity and centrifugal force are equal at this point in the cycle. As phase 8 starts to move in a clockwise direction above horizontal reference line 11 its distance from the center of rotation about shaft 1 is slightly increased due to roller 3 contact on arcuate surface S. Due to interconnection 7, the distance of phase 9 to the center of rotation about shaft 1 is simultaneously decreased by a corresponding amount. The difference between phase 8 and phase 9 radius from the center of rotation about shaft 1 causes a slight imbalance in centrifugal forces acting on the phases. As phase 8 continues on its clockwise path, its velocity, radius, and centrifugal force increase, while the velocity, radius and centrifugal force of phase 9 decreases.

The action of the phases is caused by the contact of the rollers 3 on the arcuate surface S of force retainer 4 and rotation of guide 2 which allows the phases to move while interconnection 7 maintains a fixed 12 inch distance between phase 8 and 9. When roller 3 of phase 8 contacts with arcuate surface S above reference line 11 the distance between phase 8 and its center of rotation about shaft 1 increases. The increased distance between phase 8 and its center of rotation in comparison to phase 9 causes an increase in the centrifugal force acting on phase 8 in relation to the centrifugal force acting on phase 9. The increased centrifugal force acting on phase 8 overcomes the centrifugal force of phase 9 and pulls roller 3 of phase 9 into arcuate surface S because of interconnection 7.

As rotation continues, roller 3 of phase 9 will contact arcuate surface S at or slightly below the horizontal reference line 11. Roller 3 does not contact surface S'. The force of roller 3 of phase 9 against arcuate surface S of force retainer 4 continues to increase during rotation, applying a force that equals phase 8 minus phase 9 centrifugal force. This force has a vector that points toward phase 8 in the upper cycle. When phase 8 achieves 90 degrees above horizontal line 11, its velocity, radius, and centrifugal force will be at its maximum with phase 9 velocity, radius, and centrifugal force at its minimum. As phase 8 continues its clockwise path, its velocity, radius, and centrifugal force decrease while phase 9 velocity, radius, and centrifugal force increase. When phase 8 completes one-half cycle and is positioned at 180 degrees on horizontal reference line 11 of force retainer 4, its velocity, radius, and centrifugal force will match phase 9 velocity, radius, and centrifugal force at 0 degrees. As phase 8 starts its downward path from its 180 degree position, it repeats phase 9 lower half cycle and phase 9 repeats phase 8 upper half cycle, thereby repeating the operation discussed above with phases 8 and 9 interchanged.

Phase radius and velocity increases and decreases with rotation of guide 2 and a maximum and minimum occurs one time per cycle for each phase. The shortest radius that the phases will experience during their orbit occurs at 270 degrees. Starting from 270 degrees and rotating clockwise, velocity continues to increase and maximizes at 90 degrees. Passing 90 degrees, velocity starts to decrease and continues to decrease until 270 degrees is reached. The radius and velocity change is due to the orbital path of the phases being offset by roller 3 contact with arcuate surface S on force retainer 4 and the greater centrifugal force of the phase opposite the phase with its roller in contact with surface S. When phase radius is equal on both phases, centrifugal force of each phase cancel out, and therefore, no force gain occurs at 0 and 180 degree positions. In this example, the cycle frequency remains constant at 300 revolutions per minute or one cycle every 0.2 seconds.

Imbalance in centrifugal forces relates to Newton's first and second laws of motion. A derivative of force equals mass times acceleration, and can be used for centripetal or centrifugal force with variables of weight, frequency, and radius.

Stated mathematically:

$$Fc = M \, Ac \quad \begin{aligned} Fc &= \text{force centripetal} \\ M &= \text{mass} \\ Ac &= \text{acceleration centripetal} \end{aligned}$$

Centripetal acceleration equals velocity squared divided by radius.

$$Ac = V^2/r \quad \begin{aligned} Ac &= \text{accerleration centripetal} \\ V^2 &= \text{velocity squared} \\ r &= \text{radius} \end{aligned}$$

Velocity equals circumference multiplied by frequency.

$$V = 2\pi r f \quad \begin{aligned} V &= \text{velocity} \\ r &= \text{radius} \\ f &= \text{frequency} \\ \pi &= 3.1415927 \end{aligned}$$

Substituting for velocity squared.

$$Fc = M \, (2\pi r f)^2 / r \quad \begin{aligned} Fc &= \text{force centripetal} \\ M &= \text{mass} \\ (2\pi r f)^2/r &= V^2/r = Ac \\ r &= \text{radius} \\ \pi &= 3.1415927 \end{aligned}$$

Brackets and square functions removed.

$$Fc = M22\pi\pi rrff/r$$

Radius divided by radius cancel, 2 multiplied by 2.

$$Fc = M4\pi^2 r f^2 \quad \begin{aligned} fc &= \text{force centripetal} \\ M &= \text{mass} \\ \pi &= 3.1415927 \\ r &= \text{radius} \\ f &= \text{frequency} \end{aligned}$$

Four multiplied by Pi squared.

$$C = 4\pi^2 \quad C = 39.478418 = \text{constant}$$
$$\pi^2 = 9.8696044$$

Outside gravitational fields.

$$Fc = MCrf^2 \quad \begin{aligned} Fc &= \text{force centripetal} \\ M &= \text{mass} \\ C &= 39.478418 \\ r &= \text{radius} \\ f &= \text{frequency} \end{aligned}$$

Earth gravitational field mass=weight/g.

$$M = W/g \quad \begin{aligned} M &= \text{mass} \\ W &= \text{weight} \\ g &= 32 \text{ Ft./Sec.}^2 \end{aligned}$$

Substituting weight for mass.

$$Fc = MCrf^2$$

$$Fc/Crf^2 = M = W/g$$

$$Fc/Crf^2 = W/g$$

$$(g/1)(Fc/Crf^2) = (W/g)(g/1)$$

$$gFc/Crf^2 = Wg/g$$

$$gFc/Crf^2 = W$$

$$gFc = WCrf^2$$

$$Fc = WCrf^2/g$$

$Fc$ = force centripetal
$W$ = weight
$C$ = 39.478418
$r$ = radius
$f$ = frequency
$g$ = 32 Ft./Sec.$^2$ The equation for Fc states that the magnitude of centripetal or centrifugal force experienced by an object as it travels through a circular path is in proportion to its weight, frequency, and radius. The value of f in the above equation is in cycles per second when used with units of feet and pounds.

Table One shows phase 8 approximate radius in feet from 0 to 90 degrees and 180 to 270 degrees.

Table Two is a plot of phase 8 upper half cycle from 0 to 180 degrees and shows phase 8 minus phase 9 centrifugal force. The degree indicated in Table Two is also a force vector on a single cell system causing this system to pulsate to upper left, upward and then to upper right two times each complete cycle. To increase this pulsation multiple cells are used.

Table Three is a resultant force and vector summary for movement of 0 to 45 degrees of a four cell single stage system, as shown in FIG. 5, with all eight phases operating in the cycle. The resultant force and vector of Table Three was obtained by using an x, y coordinate system with force components and vector addition of phases in the upper cycle. The resultant forces and vectors given in Table Three are instantaneous values that occur eight times in each cycle. The data in Table Three indicates 31.3 to 31.7 pounds of resultant force with vectors of 89.5 to 90.4 degrees. The force applied to interconnection 7 remains constant throughout the cycle at 61.7 pounds and is equal to phase 8 plus phase 9 centrifugal forces. As the number of cells increase per stage, the resultant force and vector output become closer to a constant uniform numerical value.

Table Four gives the first three degree movement of phases at, and than above, horizontal reference line 11 of force retainer 4. The cosine and sine of phase angles are multiplied by the force to obtain Fx and Fy components and then added. The tangent of the vector is equal to Fy/Fx and the resultant force equals the square root of Fy$^2$ plus Fx$^2$.

FIG. 8 illustrates resultant force output as revolutions per minute are increased or decreased on a four cell single stage system. The curve starts at 100 and increases to 600 revolutions per minute.

SUMMARY AND SCOPE

The physical body of the phases in the above examples have been presented as rectangular in form to maintain clarity. This should not be construed as limiting phase body physical characteristics to rectangular form, but merely to provide illustration.

The number of cells per stage and number of stages are not limited, but can be combined or configured to obtain multi-force vectors as in FIG. 7. Stages of larger sizes will require a rim to stabilize phase guides and cells during rotation. This rim will connect guide ends forming a type of conventional wheel with spokes when viewed from the center of shaft 1. The rim can be of light or heavyweight material to reduce or increase gyroscopic behavior during rotation. When rotated, the stages will exhibit gyroscopic behavior with or without a rim. Gimbaling or lateral circular movement of frame 6 will be required on some applications.

Force retainer 4 was shown as stationary in the above examples but may be realigned or movable to redirect the resultant force output vector within a 360 degree plane of shaft 1 rotation.

Counter torque caused by phase inertia during rotation can be offset by a second stage or stages, of equal value, that rotate in the opposite direction. This configuration is illustrated in FIG. 7. Ratios given in the specification are approximate values and can be varied to produce lesser or greater force output of systems.

The mathematical equations used in above specifications neglected friction losses and yield approximate values that are used herein to place numerical values on the system. This should not be construed as limiting the characteristics of this system but merely to provide illustration.

The reader will see that this invention converts centrifugal forces into a usable unified vectored force with magnitude. This invention can be used to push or pull objects. In addition, this invention is reusable and powered by rotational energy. Resultant vectored force is an integral product of the invention.

Although the description above contains many specifics, these should not be construed as limiting the scope of this invention but as merely providing illustrations of some of the presently preferred embodiments. For example, this invention can be used in conjunction with past, present, or future technologies to aid and/or improve their means of movement.

Numerous other applications will be derived for the use of the resultant force produced by this invention. Thus, the scope of this invention should be determined by the appended claims and their legal equivalents, rather than by examples given.

I claim:
1. Centrifugal inertia drive comprising:
    a guide establishing an even number of multiple guideways of predetermined length extending outward from a central axis in a radial manner at equal angular intervals;
    a shaft coinciding with the central axis of the radial configuration of said guideways;
    a phase establishing a mass value supporting bidirectional linear movability in a matching manner to said guideways with a duplication of said phase mounted on each said guideway of said guide configuring multiple sets of two said phases with an angular displacement of 180 degrees;
    a roller rotatably connected to each said phase;
    a frame rotatively aligning the central axis of said shaft in a manner not inhibiting rotation of said guide;
    a retainer means focussing the net centrifugal force differences of said phases of said sets to an approximate constant vector establishing a resultant force equal to the vector addition of said centrifugal force differences physically transmitted to said frame and to any object attached thereto with centrifugal force braking effect of said phases of said sets reduced to said net centrifugal force differences of normal friction losses through association with an interconnection means;

said interconnection means having the same rotational frequency of said shaft and said guide in relationship of containing the centrifugal forces of said phases of each said set establishing bidirectional linear movement of the two said phases occurring in equal but opposite directions from the central rotational axis line of said shaft and said guide.

2. The centrifugal inertia drive of claim 1 wherein said retainer means through association with said interconnection means forms operational cells with each operational cell containing a minimum of two said phases having an angular displacement of 180 degrees establishing the algebraic sum of the centrifugal forces to range from zero to a greater numerical value and back to zero two times per cycle.

3. The centrifugal inertia drive of claim 2 wherein force contained within said operational cell equals a numerical addition of the centrifugal forces establishing a constant numerical value for a given frequency.

4. The centrifugal inertia drive of claim 2 wherein the centrifugal and centripetal components of said centrifugal force difference of said operational cell are aligned to the same rotating directional plane two times per cycle.

5. The centrifugal inertia drive of claim 1 further including a guard means for preventing said roller of said phases from being inhibited during starting and ending of rotational cycle of said guide.

6. The centrifugal inertia drive of claim 1 wherein said retainer means can be rotated through 360 degrees relative to said central rotational axis line of said guide or said shaft to redirect resultant force vector.

7. The centrifugal inertia drive of claim 1 wherein open ends of said guideways can be joined establishing a rim to stabilize and or to increase or decrease gyroscopic behavior of said guide.

8. The centrifugal inertia drive of claim 1 wherein said guideways of said guide can be configured as elongated circular members with said phases configured in a matching manner for bidirectional linear movability thereon.

9. The centrifugal inertia drive of claim 1 wherein said guideways of said guide can be configured as tracks or rails with said phases configured in a matching manner for bidirectional linear movability thereon.

10. The centrifugal inertia drive of claim 1 wherein originates an increase in the inertia value that is equal to the vector addition of said centrifugal force differences that is required to enter one of three transitional states where the increased inertia value must be transferred to another object or a velocity change must take place or a combination thereof.

11. The centrifugal inertia drive of claim 1 wherein establishes a single stage that can be applied in singular or multiple forms.

12. Centrifugal inertia drive comprising:
a guide establishing an even number of multiple guideways of predetermined linear length that extend outward from a central axis in a radial manner at equal angular intervals;
a phase establishing a mass value supporting bidirectional linear movability in a matching manner to said guideways with a duplication of said phase mounted on each said guideway of said guide configuring multiple sets of two said phases with an angular displacement of 180 degrees;
a frame rotatively aligning the central axis of said guide in a manner not inhibiting rotation;
a retainer means focussing the net centrifugal force differences of said phases of said sets to an approximate constant vector establishing a resultant force equal to the vector addition of said centrifugal force differences physically transmitted to said frame and to any object attached thereto with centrifugal force braking effect of said phases of said sets reduced to said net centrifugal force differences of normal friction losses through association with an interconnection means;
said interconnection means having the same rotational frequency of said guide in relationship of containing the centrifugal forces of said phases of each said set establishing bidirectional linear movement of the two said phases occurring in equal but opposite directions from the central rotational axis line of said guide.

13. The centrifugal inertia drive of claim 12 wherein said retainer means through association with said interconnection means forms operational cells with each operational cell containing a minimum of two said phases having an angular displacement of 180 degrees establishing the algebraic sum of centrifugal forces to range from zero to a greater numerical value and back to zero two times per cycle.

14. The centrifugal inertia drive of claim 13 wherein force contained within said operational cell equals a numerical addition of the centrifugal forces establishing a constant numerical value for a given frequency.

15. The centrifugal inertia drive of claim 12 wherein said retainer means can be rotated through 360 degrees relative to said central rotational axis line of said guide to redirect resultant force vector.

16. The centrifugal inertia drive of claim 12 wherein open ends of said guideways can be joined establishing a rim to stabilize and or to increase or decrease gyroscopic behavior of said guide.

17. The centrifugal inertia drive of claim 12 wherein said guideways of said guide can be configured as elongated circular members with said phases configured in a matching manner for bidirectional linear movability thereon.

18. The centrifugal inertia drive of claim 12 wherein said guideways of said guide can be configured as tracks or rails with said phases configured in a matching manner for bidirectional linear movability thereon.

19. The centrifugal inertia drive of claim 12 wherein originates an increase in the inertia value that is equal to the vector addition of said centrifugal force differences that is required to enter one of three transitional states where the increased inertia value must be transferred to another object or a velocity change must take place or a combination thereof.

20. The centrifugal inertia drive of claim 12 wherein establishes a single stage that can be applied in singular or multiple forms.

* * * * *

Centrifugal Inertia Drive

Table One

| Degree | Phase radius | Degree | Phase radius | Degree | Phase radius | Degree | Phase radius |
|---|---|---|---|---|---|---|---|
| 0 | 0.50000 | 30 | 0.56625 | 60 | 0.61025 | 180 | 0.50000 |
| 1 | 0.50400 | 31 | 0.56792 | 61 | 0.61100 | 181 | 0.49600 |
| 2 | 0.50467 | 32 | 0.57017 | 62 | 0.61208 | 182 | 0.49533 |
| 3 | 0.50692 | 33 | 0.57217 | 63 | 0.61300 | 183 | 0.49308 |
| 4 | 0.50875 | 34 | 0.57375 | 64 | 0.61408 | 184 | 0.49125 |
| 5 | 0.51133 | 35 | 0.57567 | 65 | 0.61483 | 185 | 0.48867 |
| 6 | 0.51342 | 36 | 0.57750 | 66 | 0.61633 | 186 | 0.48658 |
| 7 | 0.51583 | 37 | 0.57908 | 67 | 0.61700 | 187 | 0.48417 |
| 8 | 0.51900 | 38 | 0.58033 | 68 | 0.61825 | 188 | 0.48100 |
| 9 | 0.52167 | 39 | 0.58250 | 69 | 0.61850 | 189 | 0.47833 |
| 10 | 0.52300 | 40 | 0.58392 | 70 | 0.61933 | 190 | 0.47700 |
| 11 | 0.52567 | 41 | 0.58608 | 71 | 0.61992 | 191 | 0.47433 |
| 12 | 0.52792 | 42 | 0.58675 | 72 | 0.62050 | 192 | 0.47208 |
| 13 | 0.52967 | 43 | 0.58892 | 73 | 0.62092 | 193 | 0.47033 |
| 14 | 0.53275 | 44 | 0.59017 | 74 | 0.62108 | 194 | 0.46725 |
| 15 | 0.53600 | 45 | 0.59208 | 75 | 0.62125 | 195 | 0.46400 |
| 16 | 0.53733 | 46 | 0.59400 | 76 | 0.62167 | 196 | 0.46267 |
| 17 | 0.53967 | 47 | 0.59517 | 77 | 0.62225 | 197 | 0.46033 |
| 18 | 0.54158 | 48 | 0.59663 | 78 | 0.62292 | 198 | 0.45842 |
| 19 | 0.54442 | 49 | 0.59733 | 79 | 0.62325 | 199 | 0.45558 |
| 20 | 0.54617 | 50 | 0.59867 | 80 | 0.62342 | 200 | 0.45383 |
| 21 | 0.54800 | 51 | 0.59992 | 81 | 0.62358 | 201 | 0.45200 |
| 22 | 0.55025 | 52 | 0.60167 | 82 | 0.62367 | 202 | 0.44975 |
| 23 | 0.55283 | 53 | 0.60283 | 83 | 0.62375 | 203 | 0.44717 |
| 24 | 0.55483 | 54 | 0.60392 | 84 | 0.62392 | 204 | 0.44517 |
| 25 | 0.55692 | 55 | 0.60483 | 85 | 0.62400 | 205 | 0.44308 |
| 26 | 0.55808 | 56 | 0.60600 | 86 | 0.62408 | 206 | 0.44192 |
| 27 | 0.56075 | 57 | 0.60683 | 87 | 0.62417 | 207 | 0.43925 |
| 28 | 0.56275 | 58 | 0.60817 | 88 | 0.62433 | 208 | 0.43725 |
| 29 | 0.56483 | 59 | 0.60942 | 89 | 0.62467 | 209 | 0.43517 |
|  |  |  |  | 90 | 0.62500 |  |  |

| Degree | Phase radius | Degree | Phase radius |
|---|---|---|---|
| 210 | 0.43375 | 240 | 0.38975 |
| 211 | 0.43208 | 241 | 0.38900 |
| 212 | 0.42983 | 242 | 0.38792 |
| 213 | 0.42783 | 243 | 0.38700 |
| 214 | 0.42625 | 244 | 0.38592 |
| 215 | 0.42433 | 245 | 0.38517 |
| 216 | 0.42250 | 246 | 0.38367 |
| 217 | 0.42092 | 247 | 0.38300 |
| 218 | 0.41967 | 248 | 0.38175 |
| 219 | 0.41750 | 249 | 0.38150 |
| 220 | 0.41608 | 250 | 0.38067 |
| 221 | 0.41392 | 251 | 0.38008 |
| 222 | 0.41325 | 252 | 0.37950 |
| 223 | 0.41108 | 253 | 0.37908 |
| 224 | 0.40893 | 254 | 0.37892 |
| 225 | 0.40792 | 255 | 0.37875 |
| 226 | 0.40600 | 256 | 0.37833 |
| 227 | 0.40483 | 257 | 0.37775 |
| 228 | 0.40367 | 258 | 0.37708 |
| 229 | 0.40267 | 259 | 0.37675 |
| 230 | 0.40133 | 260 | 0.37658 |
| 231 | 0.40008 | 261 | 0.37642 |
| 232 | 0.39833 | 262 | 0.37633 |
| 233 | 0.39717 | 263 | 0.37625 |
| 234 | 0.39608 | 264 | 0.37608 |
| 235 | 0.39517 | 265 | 0.37600 |
| 236 | 0.39400 | 266 | 0.37592 |
| 237 | 0.39317 | 267 | 0.37583 |
| 238 | 0.39183 | 268 | 0.37567 |
| 239 | 0.39058 | 269 | 0.37533 |
|  |  | 270 | 0.37500 |

Centrifugal Inertia Drive

Table Two
Phase 8 - Phase 9 Centrifugal Force, 0 to 180 degrees

| # | Value | # | Value | # | Value | # | Value | # | Value | # | Value |
|---|---|---|---|---|---|---|---|---|---|---|---|
| 0 | 0.00000 | 30 | 8.17327 | 60 | 13.60155 | 90 | 15.42126 | 120 | 13.60155 | 150 | 8.17327 |
| 1 | 0.49348 | 31 | 8.37889 | 61 | 13.69408 | 91 | 15.38014 | 121 | 13.49875 | 151 | 7.99849 |
| 2 | 0.57573 | 32 | 8.65647 | 62 | 13.82772 | 92 | 15.33901 | 122 | 13.34453 | 152 | 7.74147 |
| 3 | 0.85331 | 33 | 8.90321 | 63 | 13.94081 | 93 | 15.31845 | 123 | 13.18003 | 153 | 7.49473 |
| 4 | 1.07949 | 34 | 9.09854 | 64 | 14.07446 | 94 | 15.30816 | 124 | 13.07723 | 154 | 7.16574 |
| 5 | 1.39819 | 35 | 9.33500 | 65 | 14.16699 | 95 | 15.29789 | 125 | 12.93329 | 155 | 7.02182 |
| 6 | 1.65522 | 36 | 9.56118 | 66 | 14.35205 | 96 | 15.28761 | 126 | 12.82021 | 156 | 6.76479 |
| 7 | 1.95336 | 37 | 9.75651 | 67 | 14.43430 | 97 | 15.26704 | 127 | 12.68655 | 157 | 6.51805 |
| 8 | 2.34403 | 38 | 9.91072 | 68 | 14.58851 | 98 | 15.25677 | 128 | 12.54263 | 158 | 6.19934 |
| 9 | 2.67302 | 39 | 10.17803 | 69 | 14.61935 | 99 | 15.24648 | 129 | 12.32673 | 159 | 5.92176 |
| 10 | 2.83751 | 40 | 10.35281 | 70 | 14.72216 | 100 | 15.22593 | 130 | 12.17252 | 160 | 5.69559 |
| 11 | 3.16650 | 41 | 10.62010 | 71 | 14.79413 | 101 | 15.20536 | 131 | 12.00802 | 161 | 5.47969 |
| 12 | 3.44409 | 42 | 10.70235 | 72 | 14.86609 | 102 | 15.16424 | 132 | 11.88465 | 162 | 5.13013 |
| 13 | 3.65998 | 43 | 10.96966 | 73 | 14.91750 | 103 | 15.08199 | 133 | 11.74072 | 163 | 4.89368 |
| 14 | 4.04037 | 44 | 11.17939 | 74 | 14.93806 | 104 | 15.01003 | 134 | 11.59679 | 164 | 4.60581 |
| 15 | 4.44132 | 45 | 11.36032 | 75 | 14.95862 | 105 | 14.95862 | 135 | 11.36032 | 165 | 4.44132 |
| 16 | 4.60581 | 46 | 11.59679 | 76 | 15.01003 | 106 | 14.93806 | 136 | 11.17939 | 166 | 4.04037 |
| 17 | 4.89368 | 47 | 11.74072 | 77 | 15.08199 | 107 | 14.91750 | 137 | 10.96966 | 167 | 3.65998 |
| 18 | 5.13013 | 48 | 11.88465 | 78 | 15.16424 | 108 | 14.86609 | 138 | 10.70235 | 168 | 3.44409 |
| 19 | 5.47969 | 49 | 12.00802 | 79 | 15.20536 | 109 | 14.79413 | 139 | 10.62010 | 169 | 3.16650 |
| 20 | 5.69559 | 50 | 12.17252 | 80 | 15.22593 | 110 | 14.72216 | 140 | 10.35281 | 170 | 2.83751 |
| 21 | 5.92176 | 51 | 12.32673 | 81 | 15.24648 | 111 | 14.61935 | 141 | 10.17803 | 171 | 2.67302 |
| 22 | 6.19934 | 52 | 12.54263 | 82 | 15.25677 | 112 | 14.58851 | 142 | 9.91072 | 172 | 2.34403 |
| 23 | 6.51805 | 53 | 12.68655 | 83 | 15.26704 | 113 | 14.43430 | 143 | 9.75651 | 173 | 1.95336 |
| 24 | 6.76479 | 54 | 12.82021 | 84 | 15.28761 | 114 | 14.35205 | 144 | 9.56118 | 174 | 1.65522 |
| 25 | 7.02182 | 55 | 12.93329 | 85 | 15.29789 | 115 | 14.16699 | 145 | 9.33500 | 175 | 1.39819 |
| 26 | 7.16574 | 56 | 13.07723 | 86 | 15.30816 | 116 | 14.07446 | 146 | 9.09854 | 176 | 1.07949 |
| 27 | 7.49473 | 57 | 13.18003 | 87 | 15.31845 | 117 | 13.94081 | 147 | 8.90321 | 177 | 0.85331 |
| 28 | 7.74147 | 58 | 13.34453 | 88 | 15.33901 | 118 | 13.82772 | 148 | 8.65647 | 178 | 0.57573 |
| 29 | 7.99849 | 59 | 13.49875 | 89 | 15.38014 | 119 | 13.69408 | 149 | 8.37889 | 179 | 0.49348 |
|   |   |   |   |   |   |   |   |   |   | 180 | 0.00000 |

Centrifugal Inertia Drive

Table Three
Resultant Force and Vector 0 to 45 degrees

| Phase 8 Degree | Force | Vector | Degree | Force | Vector |
|---|---|---|---|---|---|
| 0 | 31.48718 | 90.000 | 23 | 31.68229 | 89.861 |
| 1 | 31.49520 | 89.565 | 24 | 31.63329 | 89.904 |
| 2 | 31.41768 | 89.955 | 25 | 31.58957 | 89.891 |
| 3 | 31.33544 | 89.910 | 26 | 31.56357 | 90.171 |
| 4 | 31.37642 | 90.234 | 27 | 31.54775 | 89.884 |
| 5 | 31.34092 | 90.085 | 28 | 31.54002 | 89.954 |
| 6 | 31.36196 | 90.190 | 29 | 31.48380 | 89.915 |
| 7 | 31.37668 | 90.017 | 30 | 31.46465 | 90.257 |
| 8 | 31.43809 | 89.925 | 31 | 31.42781 | 90.108 |
| 9 | 31.46866 | 89.899 | 32 | 31.42294 | 89.825 |
| 10 | 31.43611 | 90.142 | 33 | 31.45175 | 89.868 |
| 11 | 31.45955 | 90.042 | 34 | 31.45955 | 89.958 |
| 12 | 31.45175 | 90.132 | 35 | 31.43611 | 89.858 |
| 13 | 31.42294 | 90.175 | 36 | 31.46866 | 90.101 |
| 14 | 31.42781 | 89.892 | 37 | 31.43809 | 90.075 |
| 15 | 31.46465 | 89.743 | 38 | 31.37668 | 89.983 |
| 16 | 31.48380 | 90.085 | 39 | 31.36196 | 89.810 |
| 17 | 31.54002 | 90.046 | 40 | 31.34092 | 89.915 |
| 18 | 31.54775 | 90.116 | 41 | 31.37642 | 89.766 |
| 19 | 31.56357 | 89.829 | 42 | 31.33544 | 90.090 |
| 20 | 31.58957 | 90.109 | 43 | 31.41768 | 90.045 |
| 21 | 31.63329 | 90.096 | 44 | 31.49520 | 90.435 |
| 22 | 31.68229 | 90.139 | 45 | 31.48718 | 90.000 |

Centrifugal Inertia Drive

Table Four
Resultant Force and Vector

| Angle | Force | cos | Fx | sin | Fy |
|---|---|---|---|---|---|
| 0 | 0.00000 | 1.00000 | 0.00000 | 0.00000 | 0.00000 |
| 45 | 11.36030 | 0.70711 | 8.03296 | 0.70711 | 8.03296 |
| 90 | 15.42130 | 0.00000 | 0.00000 | 1.00000 | 15.42126 |
| 135 | 11.36030 | 0.70711 | -8.03296 | 0.70711 | 8.03296 |
| 180 | 0.00000 | 1.00000 | -0.00000 | 0.00000 | 0.00000 |
|  |  | Fx Total | 0.00000 | Fy Total | 31.48718 |

Tan of vector Infinity
Resultant Force 31.4872
Resultant Vector 90.0000

| 1 | 0.49350 | 0.99985 | 0.04934 | 0.01745 | 0.00861 |
| 46 | 11.59680 | 0.69466 | 8.05581 | 0.71934 | 8.34203 |
| 91 | 15.38010 | 0.01745 | -0.26842 | 0.99985 | 15.37779 |
| 136 | 11.17940 | 0.71934 | -8.04178 | 0.69466 | 7.76585 |
|  |  | Fx Total | 0.23901 | Fy Total | 31.49429 |

Tan of vector 131.7682
Resultant Force 31.4952
Resultant Vector 89.5650

| 2 | 0.57570 | 0.99939 | 0.57538 | 0.03490 | 0.02009 |
| 47 | 11.74070 | 0.68200 | 8.00715 | 0.73135 | 8.58662 |
| 92 | 15.33900 | 0.03490 | -0.53532 | 0.99939 | 15.32966 |
| 137 | 10.96970 | 0.73135 | -8.02270 | 0.68200 | 7.48129 |
|  |  | Fx Total | 0.02451 | Fy Total | 31.41767 |

Tan of vector 1281.9300
Resultant Force 31.4177
Resultant Vector 89.9550